(12) United States Patent
Gao et al.

(10) Patent No.: US 10,985,869 B2
(45) Date of Patent: Apr. 20, 2021

(54) METHOD AND DEVICE FOR PERFORMING COMMUNICATION USING A TRANSMISSION PATTERN

(71) Applicant: NEC CORPORATION, Tokyo (JP)

(72) Inventors: Yukai Gao, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/318,586

(22) PCT Filed: Jul. 19, 2016

(86) PCT No.: PCT/CN2016/090449
§ 371 (c)(1),
(2) Date: Jan. 17, 2019

(87) PCT Pub. No.: WO2018/014189
PCT Pub. Date: Jan. 25, 2018

(65) Prior Publication Data
US 2019/0288787 A1     Sep. 19, 2019

(51) Int. Cl.
*H04L 1/00*          (2006.01)
*H04L 5/00*          (2006.01)
(Continued)

(52) U.S. Cl.
CPC ............... *H04L 1/003* (2013.01); *H04L 1/12* (2013.01); *H04L 5/0051* (2013.01);
(Continued)

(58) Field of Classification Search
None
See application file for complete search history.

(56) References Cited

U.S. PATENT DOCUMENTS

2014/0036889 A1    2/2014    Kim et al.
2014/0071954 A1    3/2014    Au et al.
(Continued)

FOREIGN PATENT DOCUMENTS

CN    103580840 A    2/2014
CN    104904305 A    9/2015
(Continued)

OTHER PUBLICATIONS

Qualcomm Incorporated, Summary of email discussion on frame structure, 3GPP TSG-RAN WG1 #85 R1-165456, May 23-27, 2016, 28 pages.
(Continued)

*Primary Examiner* — Anh Ngoc M Nguyen
(74) *Attorney, Agent, or Firm* — Sughrue Mion, PLLC

(57) ABSTRACT

Embodiments of the disclosure provide a method and device for performing communication. The method comprises: determining a target transmission pattern from a set of candidate transmission patterns, wherein each of the candidate transmission patterns contains a DL transmission part and/or a UL transmission part, and the candidate transmission patterns differ from one another in terms of time durations of the respective DL transmission parts and/or the UL transmission parts; and performing communication between a network device and a terminal device by using the target transmission pattern.

24 Claims, 21 Drawing Sheets

(51) Int. Cl.
  *H04L 5/14* (2006.01)
  *H04L 27/26* (2006.01)
  *H04W 72/04* (2009.01)
  *H04L 1/12* (2006.01)
  *H04W 72/12* (2009.01)
  *H04L 1/18* (2006.01)

(52) U.S. Cl.
  CPC .......... *H04L 5/0055* (2013.01); *H04L 5/1469* (2013.01); *H04L 27/2607* (2013.01); *H04L 27/2646* (2013.01); *H04W 72/042* (2013.01); *H04W 72/1205* (2013.01); *H04L 1/1854* (2013.01); *H04L 1/1887* (2013.01)

(56) References Cited

U.S. PATENT DOCUMENTS

| | | | | |
|---|---|---|---|---|
| 2014/0119261 | A1* | 5/2014 | Wang | H04W 72/0446 370/312 |
| 2015/0358994 | A1* | 12/2015 | Guo | H04W 72/1294 370/280 |
| 2016/0182213 | A1 | 6/2016 | Golitschek Edler von Elbwart et al. | |
| 2019/0280801 | A1* | 9/2019 | Gao | H04L 29/08 |

FOREIGN PATENT DOCUMENTS

| | | |
|---|---|---|
| CN | 105210342 A | 12/2015 |
| WO | 2016/014155 A1 | 1/2016 |

OTHER PUBLICATIONS

International Search Report for PCT/CN2016/090449 dated Mar. 31, 2017 [PCT/ISA/210].
Written Opinion for PCT/CN2016/090449 dated Mar. 31, 2017 [PCT/ISA/237].
ETRI, "Consideration on Heterogenerous TTIs in a Carrier", 3GPP TSG-RAN WG2, Meeting #91 bis, R2-154563, Oct. 5-9, 2015, pp. 1-5.
Communication dated Feb. 11, 2020 from European Patent Office in EP Application No. 16909119.6.
Communication dated Apr. 28, 2020 from Japanese Patent Office in JP Application No. 2019-502201.
Notification of Reasons for Refusal dated Dec. 8, 2020 from the Japanese Patent Office in JP Application No. 2019-502201.

* cited by examiner

METHOD AND DEVICE FOR PERFORMING COMMUNICATION USING A TRANSMISSION PATTERN

FIELD OF THE INVENTION

Embodiments of the present disclosure generally relate to communication techniques. More particularly, embodiments of the present disclosure relate to a method and device for performing communication.

BACKGROUND OF THE INVENTION

With the development of communication technologies, frequency ranges up to 100 GHz has been studied with the objective of a single technical framework addressing as many as possible usage scenarios. It has been defined some requirements and deployment scenarios, such as, enhanced mobile broadband (eMBB), ultra-reliable and low latency communications (URLLC), massive machine-type-communications (mMTC), and so on.

Generally, eMBB has a strict requirement on high peak data rate, but a relatively loose requirement on user plane latency, for example, 4 ms for uplink (UL) and downlink (DL) transmission. In contrast, URLLC requires ultra-low latency and high reliability, for example, it may require the user plane latency to be, for example, 0.5 ms for UL and DL transmission.

If a terminal device requiring eMBB service (also referred to as "eMBB terminal device") and another terminal device requiring URLLC service (also referred to as "URLLC terminal device") multiplexed in the same transmission pattern, such as a subframe, the user plane latency of eMBB may be multiple times of the user plane latency of URLLC. Thus, the eMBB terminal device may be scheduled with multiple subframes, and URLLC UE may be scheduled with one subframe for meeting a stricter user plane latency requirement.

Conventionally, time durations for UL transmission and DL transmission have been configured in the whole bandwidth. As such, if the eMBB terminal device and the URLLC terminal device are multiplexed in frequency domain, some resources may be wasted.

Therefore, there is a need for a scheme for signal transmission to reduce waste of the time and/or frequency resources.

SUMMARY OF THE INVENTION

The present disclosure proposes a solution for performing communication to reduce waste of the time and/or frequency resources.

According to a first aspect of embodiments of the present disclosure, embodiments of the present disclosure provide a method performed by a device. The device determines a target transmission pattern from a set of candidate transmission patterns. Each of the candidate transmission patterns contains a DL transmission part and/or a UL transmission part, and the candidate transmission patterns differ from one another in terms of time durations of the respective DL transmission parts and/or the UL transmission parts. Then, communication between a network device and a terminal device is performed by using the target transmission pattern.

According to a second aspect of embodiments of the present disclosure, embodiments of the present disclosure provide a device for performing communication. The device comprises: a controller configured to determining a target transmission pattern from a set of candidate transmission patterns, wherein each of the candidate transmission patterns contains a DL transmission part and/or a UL transmission part, and the candidate transmission patterns differ from one another in terms of time durations of the respective DL transmission parts and/or the UL transmission parts; and a transceiver configured to perform communication between a network device and a terminal device by using the target transmission pattern.

Other features and advantages of the embodiments of the present disclosure will also be apparent from the following description of specific embodiments when read in conjunction with the accompanying drawings, which illustrate, by way of example, the principles of embodiments of the present disclosure.

BRIEF DESCRIPTION OF THE DRAWINGS

Embodiments of the present disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
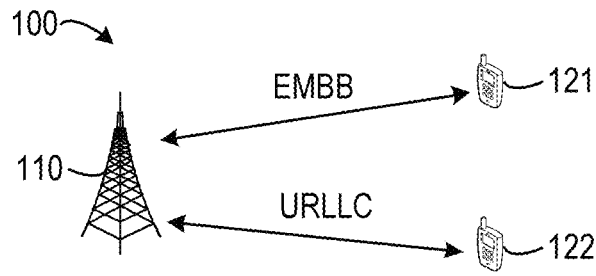
FIG. 1 illustrates a schematic diagram of a communication system 100 according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Now some exemplary embodiments of the present disclosure will be described below with reference to the figures. Reference is first made to FIG. 1, which illustrates schematic diagram of a communication system 100 according to embodiments of the present disclosure.

In the communication system 100, a network device (also referred to as BS hereafter) 110 communicates with two terminal devices (also referred to as UEs hereafter) 121 and 122 by using the same or different transmission patterns. The BS 110 is to provide an eMBB service to UE 121 and thus UE 121 may be called as an eMBB UE. The BS 110 is to provide a URLLC service to UE 122 and thus UE 122 may be called as a URLLC UE.

The term "transmission pattern" refers to settings regarding resource in time domain and/or frequency domain. For instance, a transmission pattern may correspond to one or more subframes or a certain number of symbols in time domain, and may correspond to one or more subcarriers in frequency domain. A transmission pattern contains a DL transmission part and/or a UL transmission part. A transmission pattern differs from another in terms of time durations of the respective DL transmission parts and/or the UL transmission parts. In embodiments of the present disclosure, transmission patterns may include a set of candidate transmission patterns and a target transmission pattern, wherein the target transmission pattern is selected or determined from the set of candidate transmission patterns. The set of candidate transmission patterns may include one or more downlink-centric transmission patterns mainly used for downlink data transmission, and/or one or more uplink-centric transmission patterns mainly used for uplink data transmission.

Figure 2:
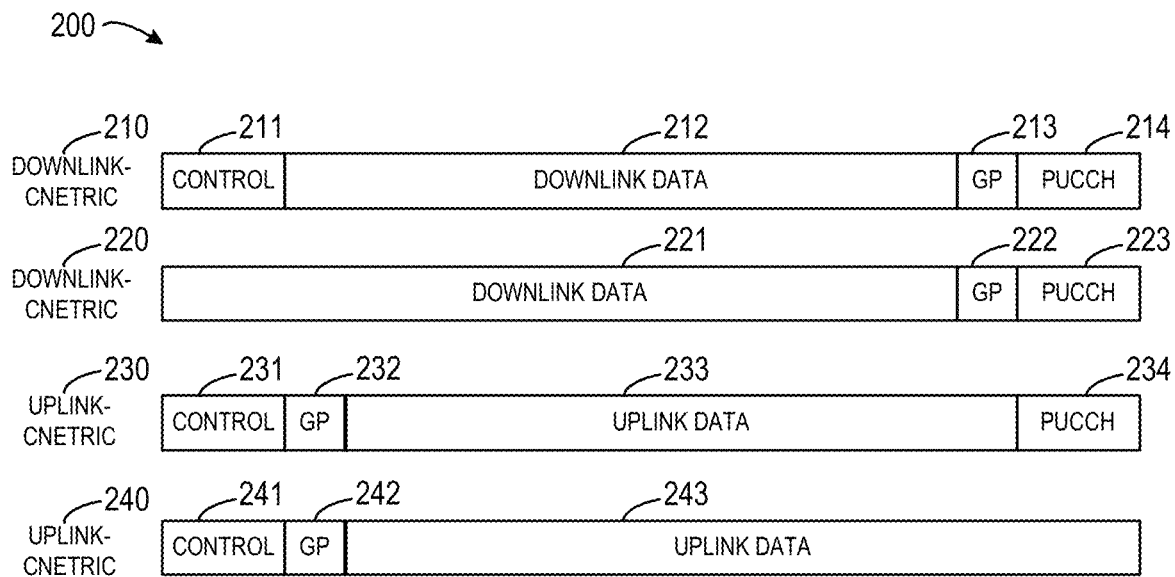
FIG. 2 illustrates a schematic diagram 200 of transmission patterns according to embodiments of the present disclosure.

FIG. 2 illustrates a diagram of downlink-centric transmission patterns and uplink-centric transmission patterns. As shown in FIG. 2, the downlink-centric transmission pattern 210 includes a downlink transmission part 211 for transmitting downlink control information, a downlink transmission part 212 for transmitting downlink data, a guard period (GP) part 213 and an uplink transmission part 214 (for example, Physical Uplink Control Channel (PUCCH)) for transmitting uplink control information. In the transmission pattern 210, the downlink transmission part 212 for transmitting the downlink data is longer than other parts, and thus it is called as a downlink-centric transmission pattern.

Similar to the downlink-centric transmission pattern 210, the downlink-centric transmission pattern 220 includes a downlink transmission part 221 for transmitting downlink data, a guard period (GP) part 222 and an uplink transmission part 223. The main difference between the downlink-centric transmission patterns 210 and 220 lies in that the transmission pattern 220 does not include a part for transmitting downlink control information.

The uplink-centric transmission pattern 230 includes a downlink transmission part 231 for transmitting downlink control information, a GP part 232, an uplink transmission part 233 for transmitting uplink data, and an uplink transmission part 234 (for example, PUCCH) for transmitting uplink control information. In the transmission pattern 230, the uplink transmission part 233 for transmitting the uplink data is longer than other parts, and thus the transmission pattern 230 is referred to as an uplink-centric transmission pattern.

Similar to the uplink-centric transmission pattern 230, the uplink-centric transmission pattern 240 includes a downlink transmission part 241 for transmitting downlink control information, a GP part 242 and an uplink transmission part 243 for transmitting uplink data. The main difference between the uplink-centric transmission patterns 230 and 240 lies in that the transmission pattern 240 does not include a part for transmitting uplink control information.

It is to be understood that, unless describing to the contrary, the term "transmission" or "communication" includes transmission or communication of control information and/or data, and the term "signal" used herein includes control information and/or data.

Conventionally, eMBB has a relatively loose requirement on user plane latency, for example, 4 ms for UL/DL transmission. In contrast, URLLC requires relatively strict user plane latency, for example, 0.5 ms for UL/DL transmission. In the example of FIG. 1, the eMBB UE 121 is scheduled with multiple subframes, and URLLC UE 122 is scheduled with one subframe for meeting the strict user plane latency requirement. If the eMBB UE 121 and the URLLC UE 122 are multiplexed in frequency domain, some resources may be wasted, which is undesirable.

Figure 3:
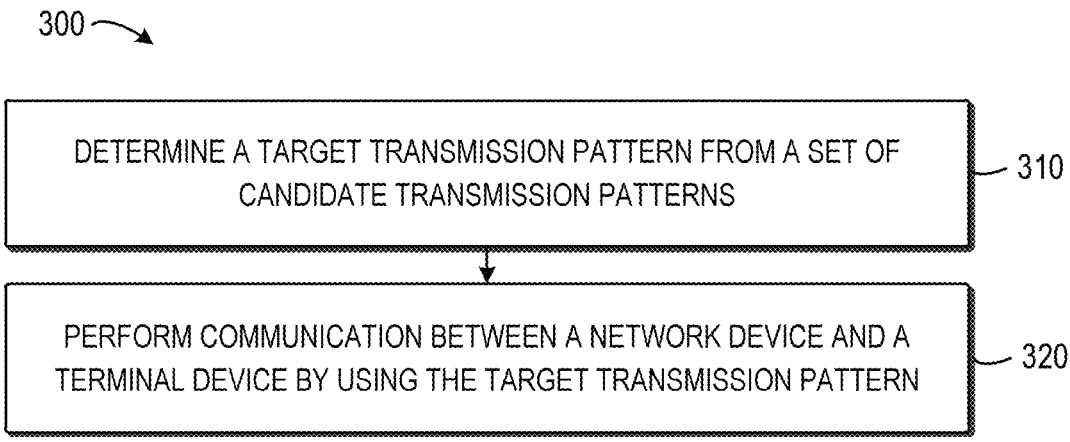
FIG. 3 illustrates a flow chart of a method 300 for performing communication according to embodiments of the present disclosure.

To solve this problem, embodiments of the present disclosure propose a solution as discussed below to reduce waste of the time and/or frequency resources. Now some exemplary embodiments of the present disclosure will be described below with reference to the following figures. FIG. 3 illustrates a flow chart of a method 300 for signal transmission according to embodiments of the present disclosure. The method 300 may be implemented by the BS 110, the terminal device 121, the terminal device 122 or other suitable device.

The method 300 is entered in block 310, where a target transmission pattern is determined from a set of candidate transmission patterns. Each of the candidate transmission patterns contains a DL transmission part and/or a UL transmission part, and the candidate transmission patterns differ from one another in terms of time durations of the respective DL transmission parts and/or the UL transmission parts.

In accordance with embodiments of the present disclosure, the method 300 may be performed by a network device, for example the BS 110 of FIG. 1. In such embodiments, the BS 110 may determine a target transmission pattern from the set of candidate transmission patterns for each of terminal devices (for example UEs 121 and 122) served by the network device, without requiring the target transmission pattern is the same for each of terminal devices.

In some embodiments, the method 300 may be performed by a terminal device, for example UE 121 or UE 122. In such embodiment, the UE 121 or 122 may determine a target transmission pattern that is suitable for transmitting signals between it and the BS 110.

In some embodiments, one or more of the candidate transmission patterns may further include a GP part. The GP part may be between the DL transmission part and the UL transmission part.

In some embodiments, the target transmission pattern may be determined based on a feedback requirement requiring a feedback about the DL transmission to be sent in the target transmission pattern. The target transmission pattern may include a processing period (PP) for the terminal device to process data received in the DL transmission. The processing period may be implemented in the target transmission pattern in a variety of ways to meet the feedback requirement.

In an embodiment, the target transmission pattern is applicable in a Time Division Duplexing (TDD) transmission mode. In the TDD mode, length of the GP part may be extended by the processing period, such that length of the DL transmission part can be reduced by the processing period.

In another embodiment, length of the DL transmission part may be reduced by the processing period, but the length of the GP part is not affected. In such a case, there is no signal transmission on the processing period. In other words, the processing period is "blank."

In some cases, signals transmitted in the DL transmission part is reduced so that the transmitted signals can be decoded and the feedback information or feedback signal (for example, Acknowledgement (ACK)/Negative Acknowledgement (NACK)) about the transmitted signals can be prepared and sent in the same subframe.

In another embodiment, the target transmission pattern is applicable in a Frequency Division Duplexing (FDD) transmission mode. In the FDD mode, length of the DL transmission part may be reduced by the processing period.

In the above embodiments, the processing period may be used for further DL transmission of data, control information or a reference signal (RS). Feedback (for example ACK/NACK) about the further DL transmission does not need to meet the above feedback requirement. In an embodiment, feedback about the further DL transmission may be sent after the target transmission pattern. For example, if one transmission pattern corresponding to one subframe in time domain, then the feedback may be sent after the subframe corresponding to the target transmission pattern.

In some embodiments, the target transmission pattern may be determined based on a scheduling requirement requiring scheduling information about the UL transmission is to be sent in the target transmission pattern. The target transmission pattern may include a processing period for the terminal device to prepare data to be transmitted in the UL transmission. The processing period may be implemented in the target transmission pattern in a variety of ways to meet the scheduling requirement.

In an embodiment, the target transmission pattern is applicable in a TDD transmission mode. In the TDD mode, length of the GP part may be extended by the processing period, such that length of the UL transmission part can be reduced by the processing period.

In another embodiment, length of the UL transmission part may be reduced by the processing period, but the length of the GP part is not affected. In such a case, there is no signal on the processing period. In other words, the processing period is "blank." In another embodiment, the target transmission pattern is applicable in a FDD transmission mode. In the FDD mode, length of the UL transmission part may be reduced by the processing period.

In the above embodiments, the processing period may be used for further UL transmission of data or a reference signal. Scheduling information about the further UL transmission may be already sent before the target transmission pattern, for example in a previous subframe.

In another embodiment, length of the DL transmission part may be reduced by the processing period, but the length of the UL transmission part is not effected. In such a case, there is no signal on the processing period. In other words, the processing period is "blank". In some scenarios, the scheduling signals for the UL transmission part transmitted in the DL transmission part is reduced so that the corresponding UL transmission signals can be can be prepared and sent in the same subframe.

In the above embodiment, the processing period may be used for further DL transmission of control signaling (e.g. Channel State Information (CSI) feedback) or data or a reference signal.

In accordance with embodiments of the present disclosure, the target transmission pattern includes an indication for indicating itself. In an embodiment, the indication may be included in control information transmitted in the DL transmission part and/or the UL transmission part, for example, Downlink Control Information (DCI), Uplink Control Information (UCI), and the like. In some embodiments, the indication may indicate one or more of: the time duration of the DL transmission part and/or the UL transmission part; a time duration of a GP part between the DL transmission part and the UL transmission part; and whether there is communication on the DL transmission part or the UL transmission part.

In another embodiment, the indication of target transmission pattern may be included in predefined time-frequency resources. And the resources may be common to all UEs and may be not limited to resources defined in the target transmission pattern.

Still referring to FIG. 3, in block 320, communication is performed between a network device and a terminal device by using the target transmission pattern. In some embodiments, when the network device (for example, the BS 110) determines the target transmission pattern for the terminal device (for example, the UE 122) in block 310, it may perform communication with the UE 122 by using the target transmission pattern. For instance, the BS 110 may send data to the UE 122 or receive data from the UE 122 according to the target transmission pattern.

Alternatively, when the terminal device (for example, the UE 122) determines the target transmission pattern in block 310, it may perform communication with the BS 110 by using the target transmission pattern. For instance, the UE 122 may send data to the BS 110 or receive data from the BS 110 according to the target transmission pattern.

In accordance with embodiments of the present disclosure, for downlink-centric transmission pattern, there may be different GP or PP duration configurations, such that downlink data transmission is completed earlier to obtain enough processing time. In some embodiments, a long GP may be used for ACK/NACK report for the corresponding downlink data transmission in the same transmission pattern, and a shorter GP may be used when there is no ACK/NACK report for the corresponding downlink data transmission in the same transmission pattern.

Alternatively, in some embodiments, if ACK/NACK needs to be reported in the same transmission pattern, the processing period may be used for transmitting downlink data. In an embodiment, the processing period may be kept empty. In an alternative embodiment, the processing period may be used to schedule further data for the same or other terminal device. In this case, ACK/NACK about the further data may be reported in the same transmission pattern, or in a subsequent transmission pattern. As a further alternative, the processing period may be used to transmit downlink RS for measurement, downlink data demodulation, beam tracking and so on.

For the terminal device, the feedback information, such as ACK/NACK, may be implemented in a variety of ways. In some embodiments, in the $k^{th}$ subsequent transmission pattern, there is no need of additional data processing time, since the data can be processed in the time duration of k transmission patterns. In this case, the GP may be short and kept the same in all transmission patterns.

Alternatively, in some embodiments, the feedback information about the downlink data needs to be sent in the same transmission pattern as the downlink data. The GP of the transmission pattern may contain a processing period defining data processing time of the whole transmission block. In this case, the GP may be set as a relatively long time period.

Some embodiments related to the downlink-centric transmission patterns are described as follows. In the following embodiments, a transmission pattern may be referred to as a subframe. It is to be understood that this is used for description, rather than limitation. Those skilled in the art would appreciate that the transmission pattern defines resources in time domain and/or frequency domain.

Figure 4:
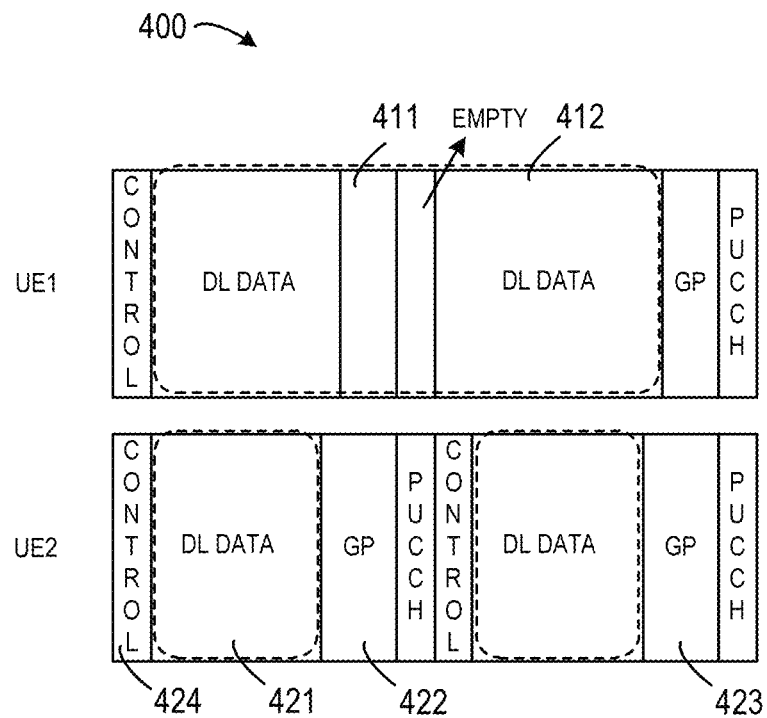
FIG. 4 illustrates a diagram 400 of transmission patterns for UE1 and UE2 with respect to TDD and different GP durations according to embodiments of the present disclosure.

FIG. 4 illustrates a diagram 400 of transmission patterns for different terminal devices, UE1 and UE2, with respect to TDD and different GP durations according to embodiments of the present disclosure. In the example of FIG. 4, the eMBB terminal device is referred to as UE1 and the URLLC terminal device is referred to as UE2. As to UE2, two transmission patterns are shown and they are the same. The DL transmission part 421 is for transmitting DL data and described as short downlink region including less symbols. In an embodiment, the number of symbols of the DL transmission part 421 may be indicated by DCI, which is included in another DL transmission part 424 for transmitting control information.

The GP 422 or 423 may be set as a long time duration if quick ACK/NACK feedback is required in the same transmission pattern, such that the GP can cover the sum of processing time, transmission advance (TA) for uplink transmission and transition time. As such, the UE2 may have enough time to process downlink data and transmit uplink with TA.

As to UE1, the GP may be set as a short time duration. For UE1 with multiple transmission pattern scheduling, it is possible that there is no processing time (only keep empty for the TA period align with UE2), so a shorter GP can be used when no PUCCH transmission in this transmission pattern. There is a shorter empty duration 411 with continuous scheduling to align with the time advance for UE1 PUCCH transmission. When multiple subframe scheduling is employed, if there is no DCI, UE1 MAY only monitor DCI in the first subframe, and skip control region in the following subframes (continuous downlink data transmission). If there is only compact DCI, UE1 may only monitor normal DCI in the first subframe, and compact DCI in the following subframes. In some alternative embodiments, the UE1 may monitor other DCI (still some DCI region reserved).

Figure 5:
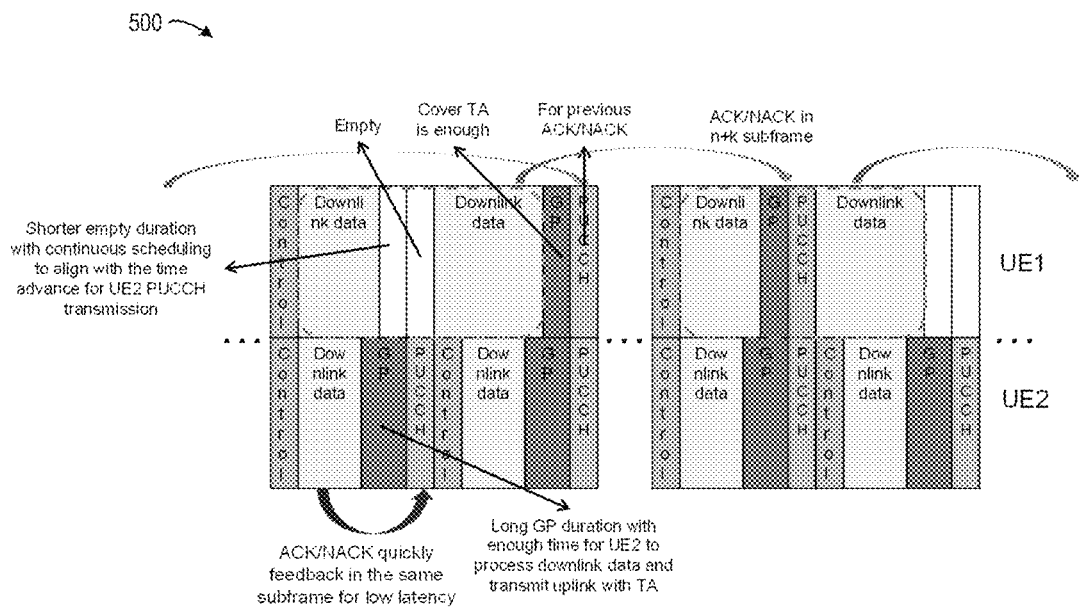
FIG. 5 illustrates a diagram 500 of transmission patterns for UE1 and UE2 with respect to TDD and different GP durations according to embodiments of the present disclosure.

FIG. 5 illustrates a diagram 500 of transmission patterns for UE1 and UE2 with respect to TDD and different GP durations according to embodiments of the present disclosure. In embodiments of FIG. 5, UE1 has a short GP duration when no PUCCH is needed, and ACK/NACK is fed back from the UE1 to the BS in a subsequent subframe, for example, the $(n+k)^{th}$ subframe, wherein n represents the subframe number of the subframe on which transmission of the DL data is completed, and k represents a subframe number after n, where k>=1. For UE2, a long GP duration is used, and the ACK/NACK is fed back in the same subframe.

Figure 6:
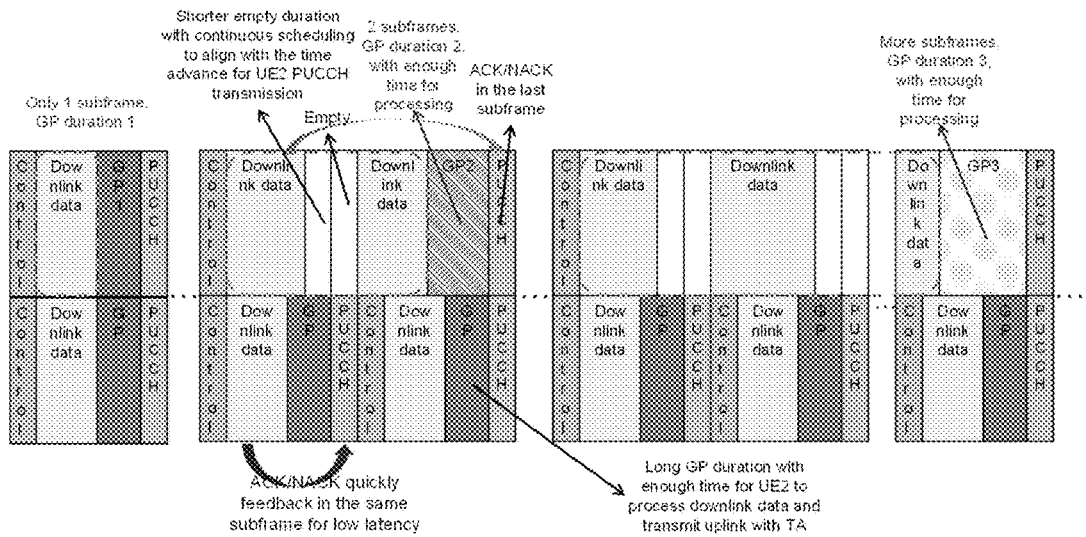
FIG. 6 illustrates a diagram 600 of transmission patterns for UE1 and UE2 with respect to TDD and different GP durations according to embodiments of the present disclosure.

FIG. 6 illustrates a diagram 600 of transmission patterns for UE1 and UE2 with respect to TDD and different GP durations according to embodiments of the present disclosure. In embodiments of FIG. 6, a long GP duration is used for UE2. A flexible GP duration is used for UE1, depending on feedback in the same subframe or not. UE 1 may feedback ACK/NACK in the last subframe for scheduling, and the GP may be different with different subframe number, for example, depending on the TB size.

Figure 7:
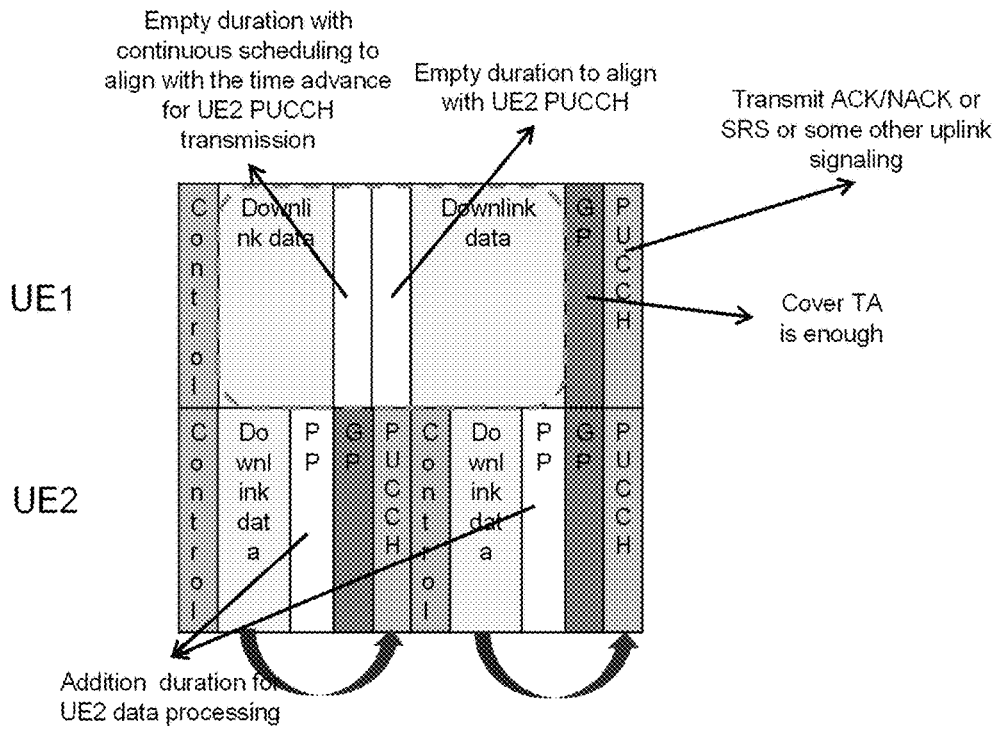
FIG. 7 illustrates a diagram 700 of transmission patterns for a UE1 and UE2 with respect to TDD and a processing period according to embodiments of the present disclosure.

FIG. 7 illustrates a diagram 700 of transmission patterns for a UE1 and UE2 with respect to TDD and a processing period according to embodiments of the present disclosure. In the example of FIG. 7, UE2 needs to report ACK/NACK in the same subframe, the GP covers the sum of transmission advance for uplink and transition time (same for all UEs), and the processing period, PP, is provided for downlink data processing. As to UE1, there may be no PP when continuous scheduling.

Figure 8:
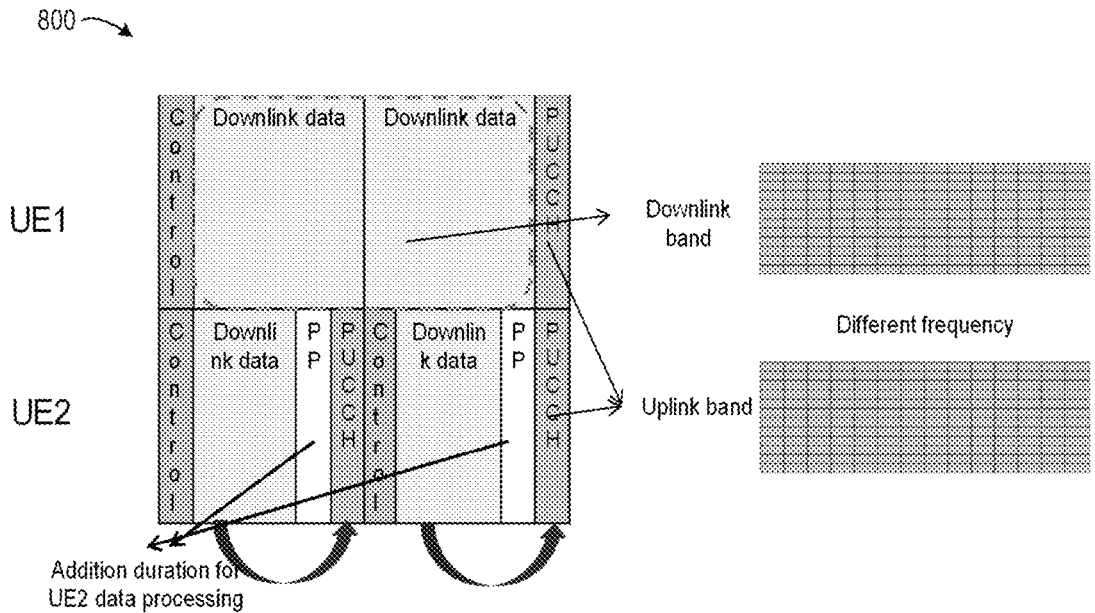
FIG. 8 illustrates a diagram 800 of transmission patterns for UE1 and UE2 with respect to FDD and a processing period according to embodiments of the present disclosure.
Figure 9:
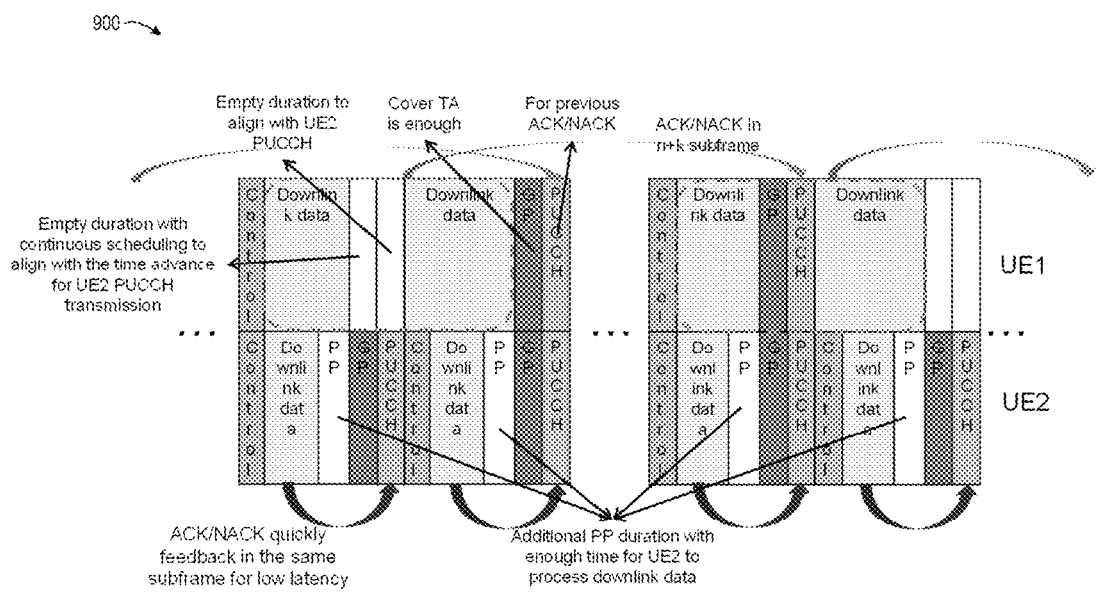
FIG. 9 illustrates a diagram 900 of transmission patterns for UE1 and UE2 with respect to TDD and a processing period according to embodiments of the present disclosure.

FIG. 8 illustrates a diagram 800 of transmission patterns for UE1 and UE2 with respect to FDD and a processing period according to embodiments of the present disclosure. In the example of FIG. 8, if UE2 needs to report ACK/NACK in the same subframe, for FDD configuration in which UL and DL transmission are in different frequency bands, there may be no need of GP for TA. As to the UE2, it may need a processing period for data processing. As to UE1, no processing period is needed when continuous scheduling FIG. 9 illustrates a diagram 900 of transmission patterns for UE1 and UE2 with respect to TDD and a processing period according to embodiments of the present disclosure. In the example of FIG. 9, UE2 needs a PP for data processing, and ACK/NACK feedback is in the same subframe. As to UE1, no PP is needed when continuous scheduling, and ACK/NACK feedback is in the $(n+k)^{th}$ subframe.

Figure 10:
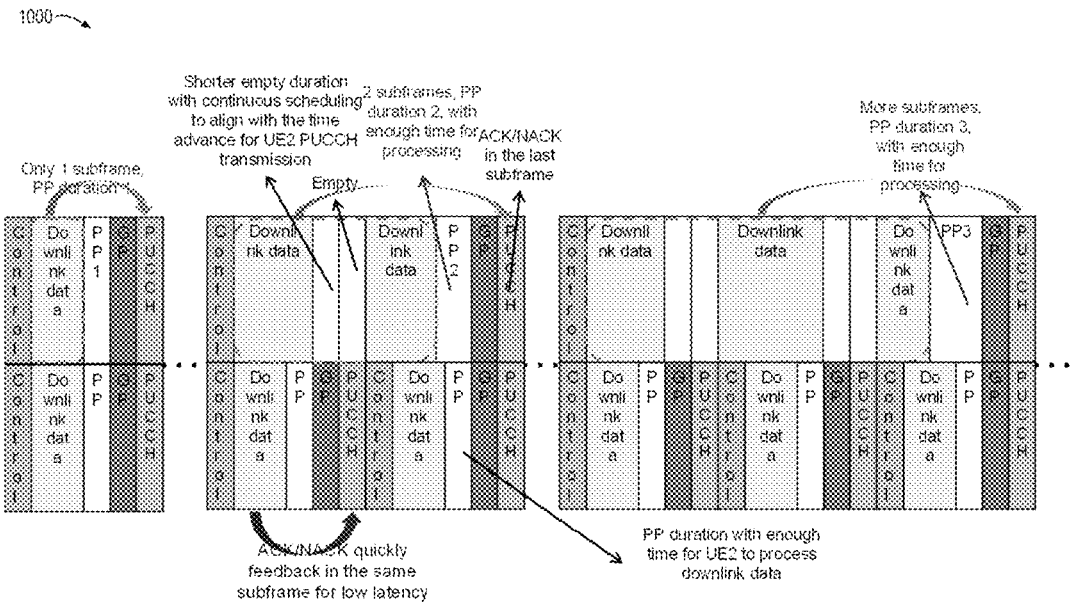
FIG. 10 illustrates a diagram 1000 of transmission patterns for UE1 and UE2 with respect to TDD and a processing period according to embodiments of the present disclosure.

FIG. 10 illustrates a diagram 1000 of transmission patterns for UE1 and UE2 with respect to TDD and a processing period according to embodiments of the present disclosure. In the example of FIG. 10, the UE2 has a long duration of PP. As to UE1, a flexible PP duration may be used for different subframe number (related to the TB size). UE1 sends the ACK/NACK feedback in the last subframe for scheduling.

Figure 11:
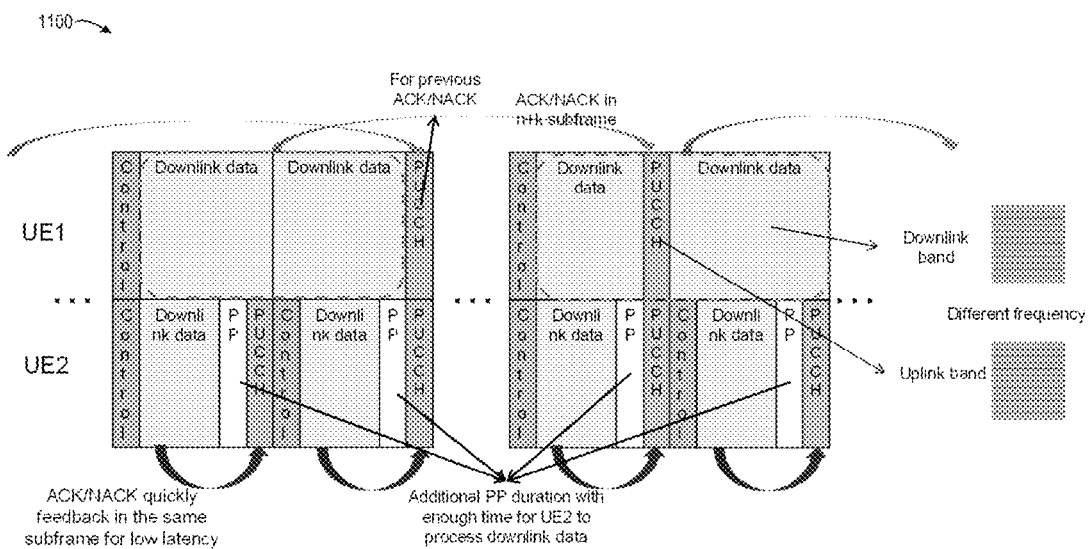
FIG. 11 illustrates a diagram 1100 of transmission patterns for UE1 and UE2 with respect to FDD and a processing period according to embodiments of the present disclosure.

FIG. 11 illustrates a diagram 1100 of transmission patterns for UE1 and UE2 with respect to FDD and a processing period according to embodiments of the present disclosure. In the example of FIG. 11, the UE2 has a PP, and ACK/NACK feedback is in the same subframe. As to UE1, no PP is needed when no PUCCH needed, and ACK/NACK feedback is in the $(n+k)^{th}$ subframe.

Figure 12:
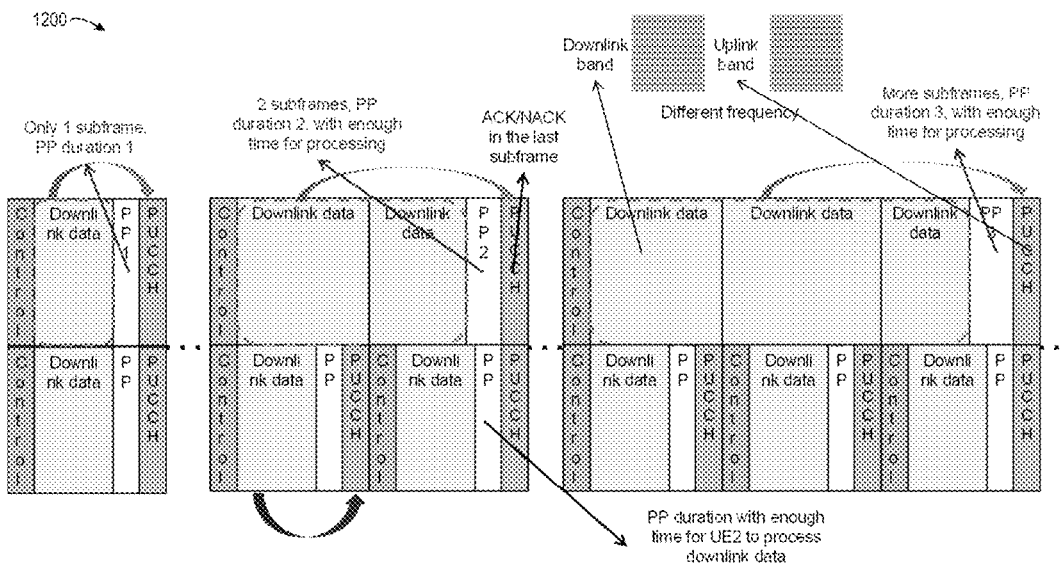
FIG. 12 illustrates a diagram 1200 of transmission patterns for UE1 and UE2 with respect to FDD and a processing period according to embodiments of the present disclosure.

FIG. 12 illustrates a diagram 1200 of transmission patterns for UE1 and UE2 with respect to FDD and a processing period according to embodiments of the present disclosure. In the example of FIG. 12, the UE2 has a long duration of PP. As to UE1, a flexible PP duration may be used for different subframe number (related to the TB size). UE1 sends the ACK/NACK feedback in the last subframe for scheduling.

Figure 13:
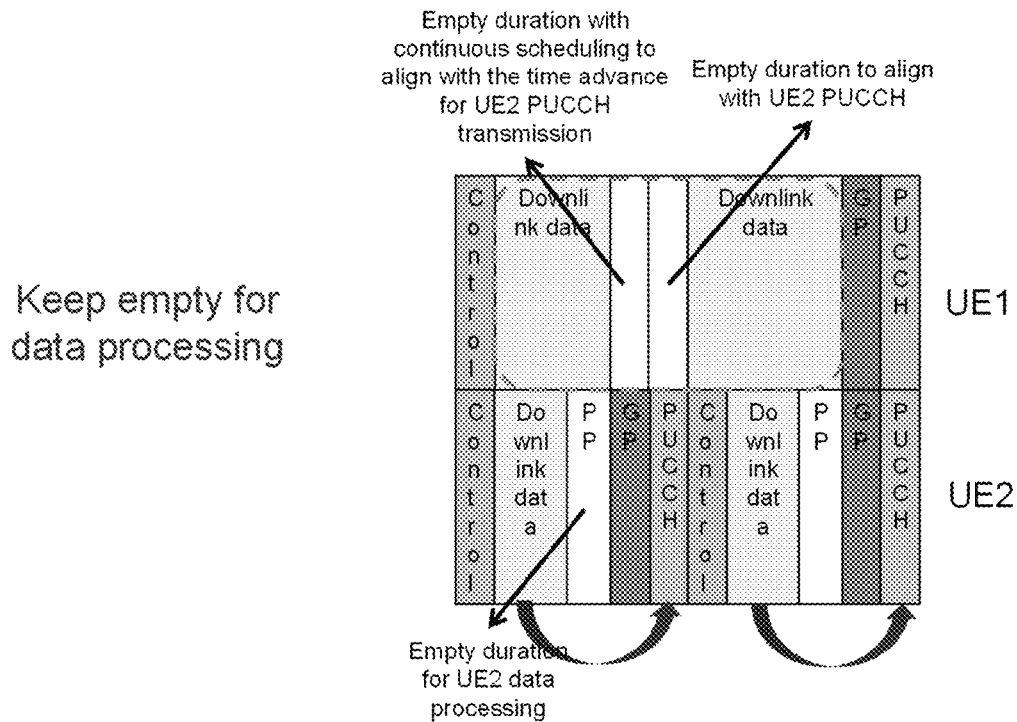
FIG. 13 illustrates a diagram 1300 of transmission patterns for UE1 and UE2 with respect to TDD and a processing period according to embodiments of the present disclosure.

FIG. 13 illustrates a diagram 1300 of transmission patterns for UE1 and UE2 with respect to TDD and a processing period according to embodiments of the present disclosure. In the example of FIG. 13, if UE2 needs to report ACK/NACK in the same subframe, the GP may cover the sum of transmission advance for uplink and transition time (same for all UEs) and the PP is used for processing downlink data. While for UE1, no PP is needed when continuous scheduling.

Figure 14:
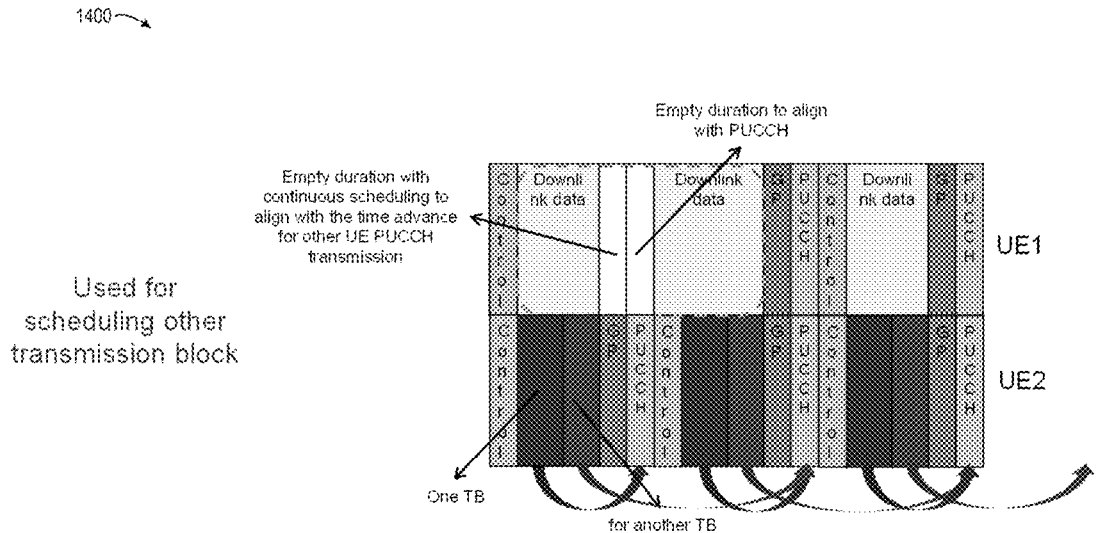
FIG. 14 illustrates a diagram 1400 of transmission patterns for UE1 and UE2 with respect to TDD and a processing period according to embodiments of the present disclosure.

FIG. 14 illustrates a diagram 1400 of transmission patterns for UE1 and UE2 with respect to TDD and a processing period according to embodiments of the present disclosure. In the example of FIG. 14, the PP may also be used for other UE scheduling, but the ACK/NACK of this period should be delayed to $(n+k)^{th}$ subframe.

Figure 15:
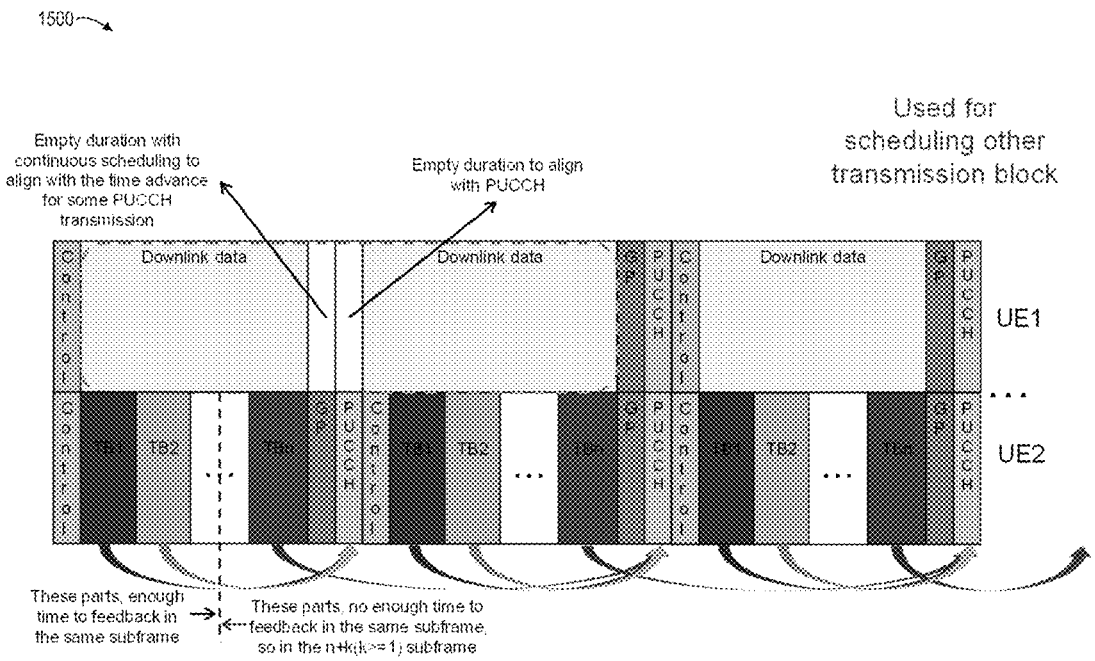
FIG. 15 illustrates a diagram 1500 of transmission patterns for UE1 and UE2 with respect to TDD and a processing period according to embodiments of the present disclosure.

FIG. 15 illustrates a diagram 1500 of transmission patterns for UE1 and UE2 with respect to TDD and a processing period according to embodiments of the present disclosure. In the example of FIG. 15, for UE2, there may be one or more DL transmission parts. With regard to some of the DL transmission parts, the subframe has enough time for data processing and thus the ACK/NACK can be fed back in the same subframe. For other DL transmission parts, the ACK/NACK may be reported in a subsequent subframe, for example, the $(n+k)^{th}$ subframe. In the transmission pattern shown in FIG. 15, each DL transmission part may contain DCI. Alternatively, DCI may be included at the beginning, and there are part indication bits in the DCI.

Figure 16:
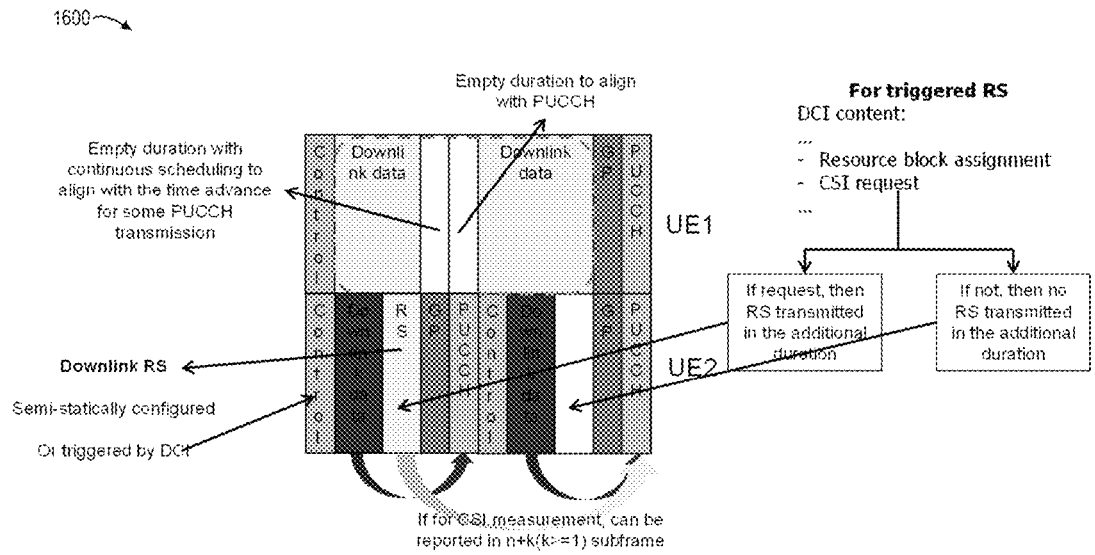
FIG. 16 illustrates a diagram 1600 of transmission patterns for UE1 and UE2 with respect to TDD and a processing period according to embodiments of the present disclosure.
Figure 17:
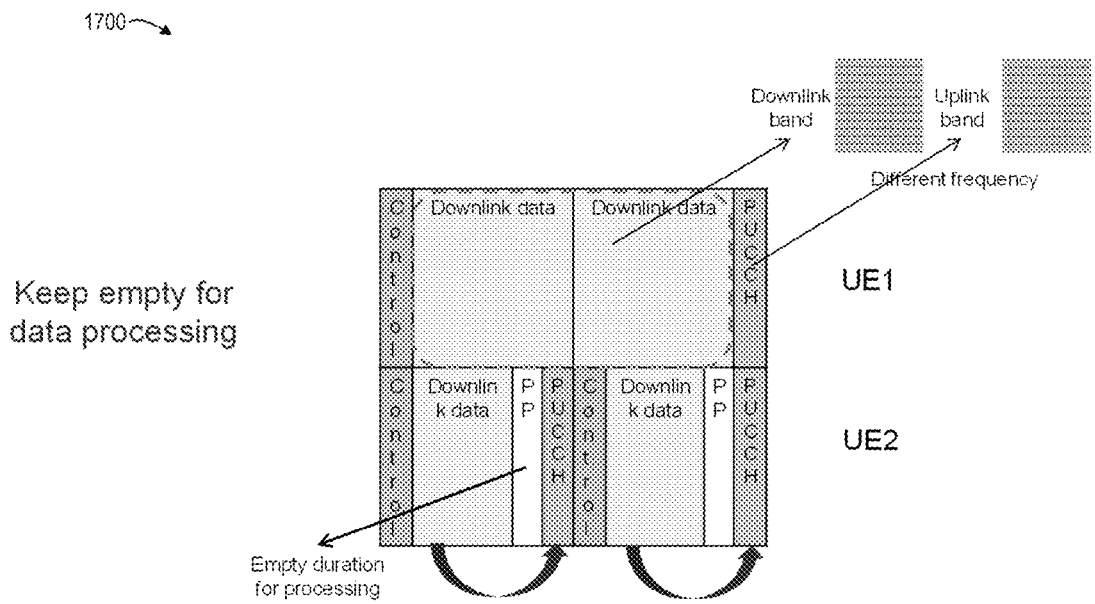
FIG. 17 illustrates a diagram 1700 of transmission patterns for UE1 and UE2 with respect to FDD and a processing period according to embodiments of the present disclosure.

FIG. 16 illustrates a diagram 1600 of transmission patterns for UE1 and UE2 with respect to TDD and a processing period according to embodiments of the present disclosure. In the example of FIG. 16, the PP may be used for some other transmission, for example, downlink RS for measurement, beam tracking, demodulation, and so on. RS may be used for CSI measurement, downlink data demodulation reference, beam tracking, and the like. The downlink RS may be semi-statically configured or triggered in the downlink DCI. The duration for RS transmission may guarantee enough time for downlink data processing, and thus the ACK/NACK may be fed back in the same subframe FIG. 17 illustrates a diagram 1700 of transmission patterns for UE1 and UE2 with respect to FDD and a processing period according to embodiments of the present disclosure. In the example of FIG. 17, if UE2 needs to report ACK/NACK in the same subframe, and the time duration of PP covers downlink data processing. With respect to UE1, no PP is needed when continuous scheduling.

Figure 18:
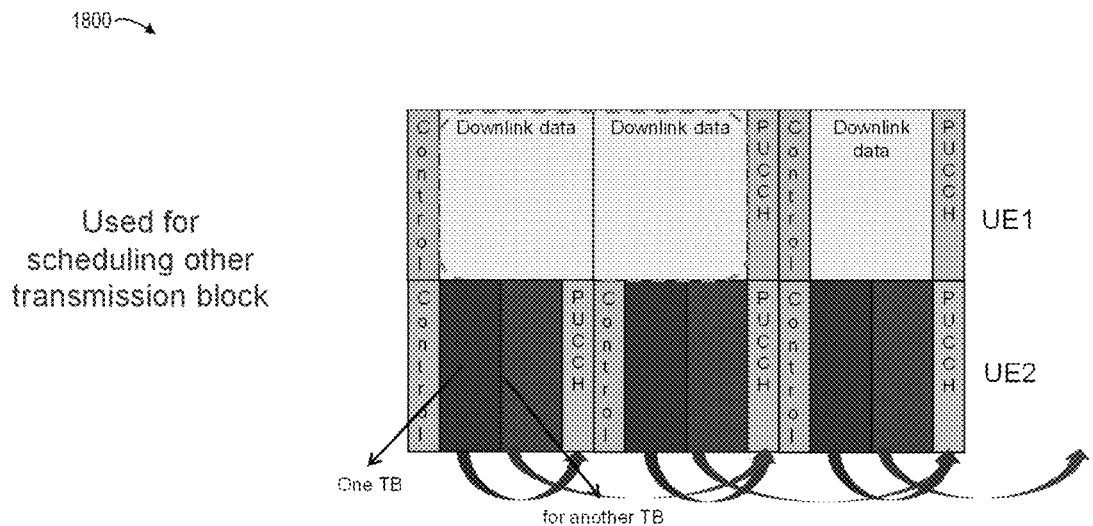
FIG. 18 illustrates a diagram 1800 of transmission patterns for UE1 and UE2 with respect to FDD and a processing period according to embodiments of the present disclosure.

FIG. 18 illustrates a diagram 1800 of transmission patterns for UE1 and UE2 with respect to FDD and a processing period according to embodiments of the present disclosure. In the example of FIG. 18, the time duration of PP may be used for other UE scheduling, but the ACK/NACK of the used period needs to be delayed to n+k (k>=1) subframe, namely, the $(n+k)^{th}$ subframe.

Figure 19:
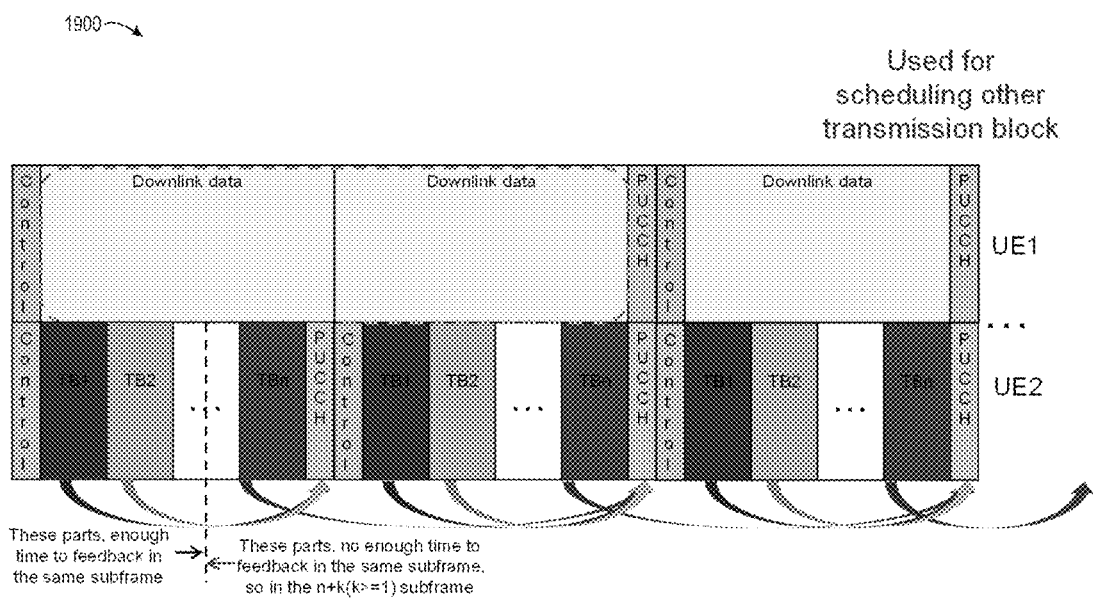
FIG. 19 illustrates a diagram 1900 of transmission patterns for UE1 and UE2 with respect to FDD and a processing period according to embodiments of the present disclosure.

FIG. 19 illustrates a diagram 1900 of transmission patterns for UE1 and UE2 with respect to FDD and a processing period according to embodiments of the present disclosure. In the example of FIG. 19, as to UE2, there may be one or more DL transmission parts. With regard to some of the DL transmission parts, the subframe has enough time for data processing and thus the ACK/NACK can be fed back in the same subframe. For other DL transmission parts, the ACK/NACK may be reported in a subsequent subframe, for example, the $(n+k)^{th}$ subframe. In the transmission pattern shown in FIG. 15, each DL transmission part may contain DCI. Alternatively, DCI may be included at the beginning, and there are part indication bits in the DCI.

Figure 20:
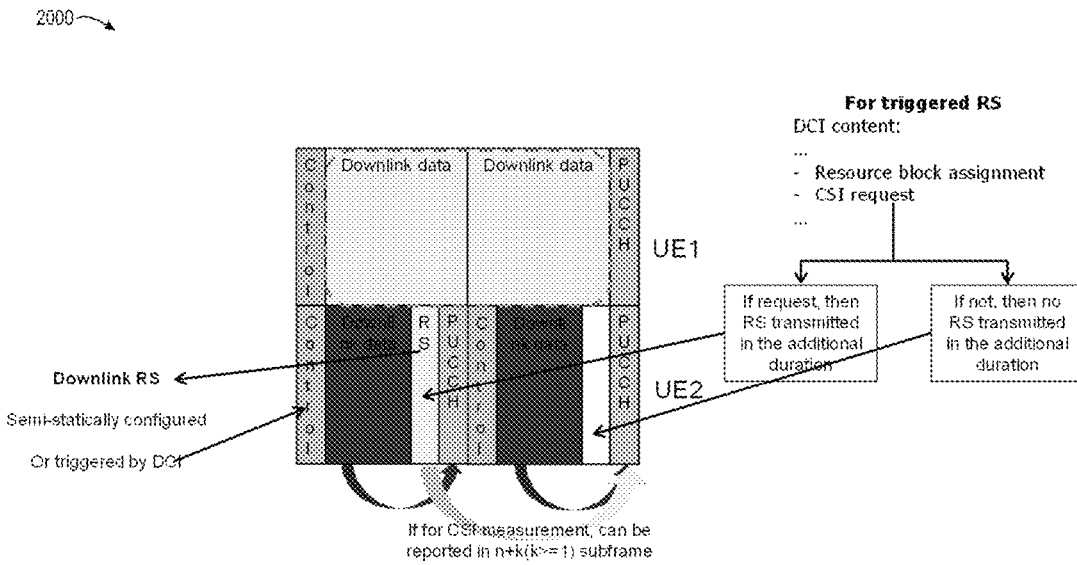
FIG. 20 illustrates a diagram 2000 of transmission patterns for UE1 and UE2 with respect to FDD and a processing period according to embodiments of the present disclosure.

FIG. 20 illustrates a diagram 2000 of transmission patterns for UE1 and UE2 with respect to FDD and a processing period according to embodiments of the present disclosure. In the example of FIG. 20, the PP may be used for some other transmission, for example, downlink RS for measurement, beam tracking, demodulation, and so on. RS may be used for CSI measurement, downlink data demodulation reference, beam tracking, and the like. The downlink RS may be semi-statically configured or triggered in the downlink DCI. The duration for RS transmission may guarantee enough time for downlink data processing, and thus the ACK/NACK may be fed back in the same subframe.

In accordance with embodiments of the present disclosure, for uplink-centric transmission pattern, there may be different GP or PP duration configurations. By delaying the UL transmission or reducing time duration for downlink control signaling, the UE2 can have enough time to prepare data for UL transmission.

In some embodiments, a long GP may be used for uplink data transmission, for example Physical Uplink Shared Channel (PUSCH) scheduling in the same transmission pattern, and a shorter GP may be used for no PUSCH or scheduling in n+k(k>=1) subframe.

Alternatively, in some embodiments, if uplink data is scheduled in the same subframe, the transmission pattern may have a processing period, namely, PP. The preparing period may be set in several ways. In an embodiment, the PP may be kept empty. In another embodiment, the PP may be used to schedule other data, for the same or other UE. For example, the PP may be used to transmit uplink data, and the scheduling may be in a previous subframe, for example, n–k (k>=1) subframe, which is also referred to as $(n-k)^{th}$ subframe. In another embodiment, the PP may be used to transmit downlink data.

In yet another embodiment, the PP may be used to transmit RS. For example, the PP may be used to transmit some uplink RS, e.g. for measurement, uplink data demodulation, beam tracking and so on. Since time duration for preparing the RS is generally less than data, the RS duration may be used for data preparation. In another embodiment, the PP may be used to transmit some downlink RS, e.g. for measurement, downlink data demodulation, beam tracking and so on.

In these embodiments, different UEs may have different PUSCH transmission time duration. In an example, in the $(n+k)^{th}$ subframe, there is no need of additional data preparing time, since data can be prepared in k subframes duration. In this case, the GP may be short and keep same in all subframes. In another example, GP of a subframe needs to contain data preparing time of the whole transmission block, and thus the GP may have a relatively long time duration.

Figure 21:
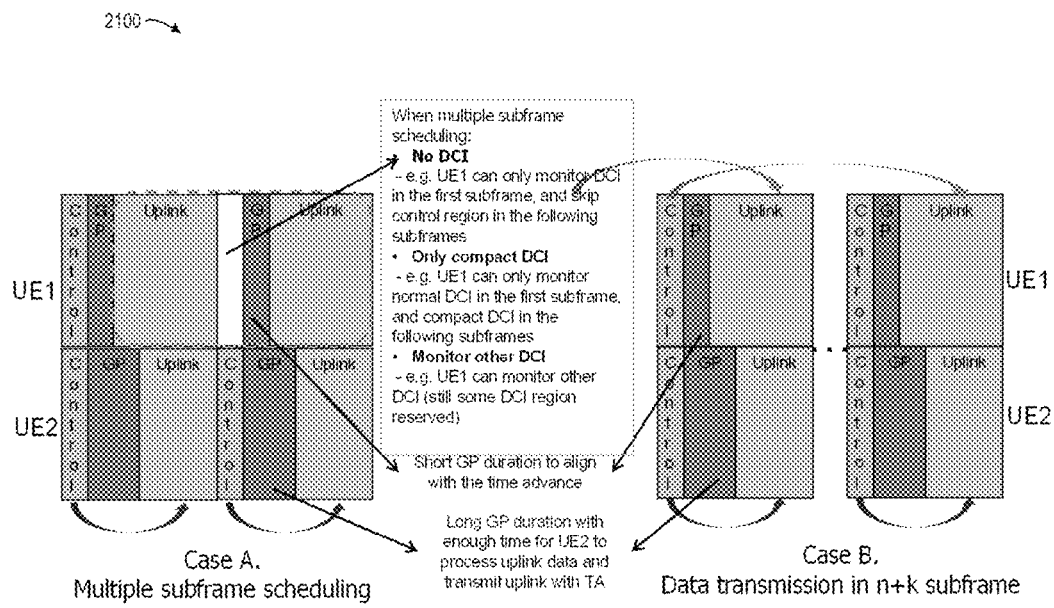
FIG. 21 illustrates a diagram 2100 of transmission patterns for UE1 and UE2 with respect to TDD and different GP durations according to embodiments of the present disclosure.

Some embodiments related to the uplink-centric transmission patterns are described as follows. FIG. 21 illustrates a diagram 2100 of transmission patterns for UE1 and UE2 with respect to TDD and different GP durations according to embodiments of the present disclosure. In embodiments of FIG. 21, as to UE2, a long time duration of GP may be used if quick data transmission is needed in the same subframe. The GP may cover the sum of preparing time, transmission advance for uplink and transition time. Uplink transmission of UE2 may be delayed for enough time of data processing, and GP occupies some uplink region.

As to UE 1, in an embodiment (referred to as Case A hereafter) where multiple subframe scheduling is employed, the preparing time may be not needed in some subframes. In another embodiment (referred to as Case B hereafter) with data transmission in n+k(k>=1) subframe, the preparing time may be not needed.

Figure 22:
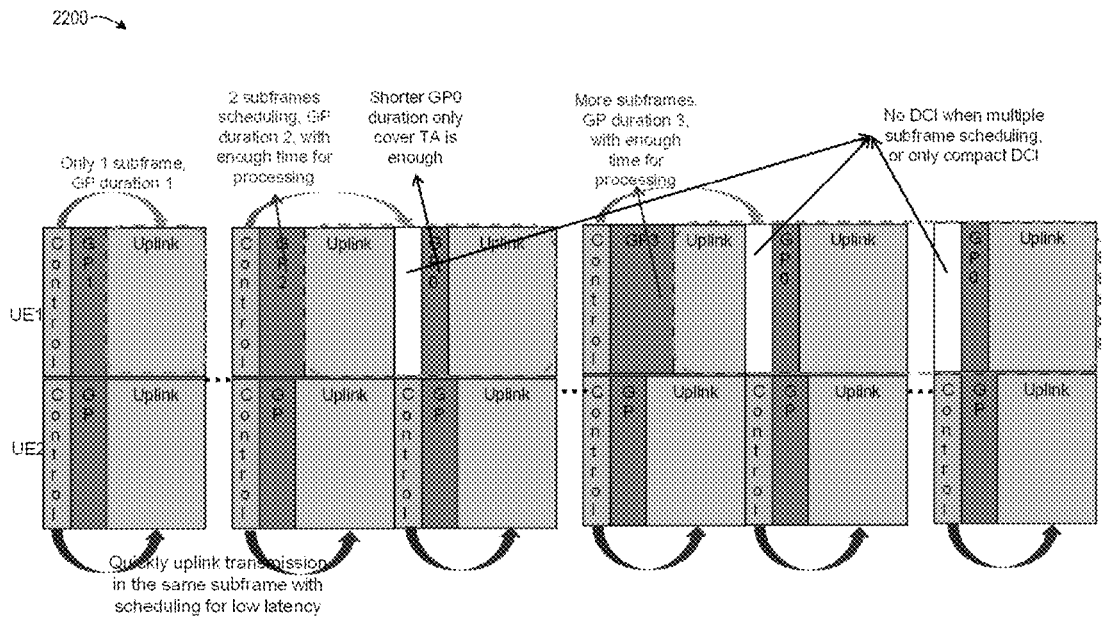
FIG. 22 illustrates a diagram 2200 of transmission patterns for UE1 and UE2 with respect to TDD and different GP durations according to embodiments of the present disclosure.

FIG. 22 illustrates a diagram 2200 of transmission patterns for UE1 and UE2 with respect to TDD and different GP durations according to embodiments of the present disclosure. In embodiments of FIG. 22, a long time duration of GP may be used for UE2, and a flexible GP duration may be used for UE1. As to UE1, uplink data transmission may be in the same subframe with scheduling, and the GP may be different with different subframe number (related to the TB size). For example, in the same subframe with both uplink data scheduling and the corresponding uplink data transmission, the GP is longer for uplink data processing. And in other subframes with only uplink data transmission, the GP is shorter for TA for uplink data transmission.

Figure 23:
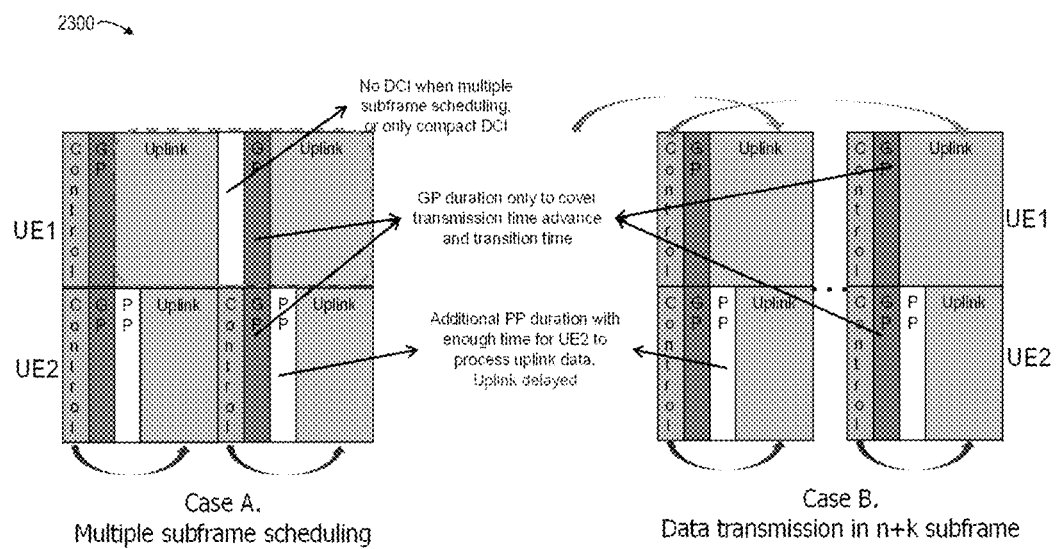
FIG. 23 illustrates a diagram 2300 of transmission patterns for UE1 and UE2 with respect to TDD and PP according to embodiments of the present disclosure.

FIG. 23 illustrates a diagram 2300 of transmission patterns for UE1 and UE2 with respect to TDD and PP according to embodiments of the present disclosure. In embodiments of FIG. 23, if UE2 needs to transmit uplink data in the same subframe, the GP may cover the sum of transmission advance for uplink and transition time (same for all UEs). In the embodiments, a PP is used for uplink data processing of UE2. While for UE1, the PP is not used when multiple subframe scheduling or n+k subframe scheduling.

Figure 24:
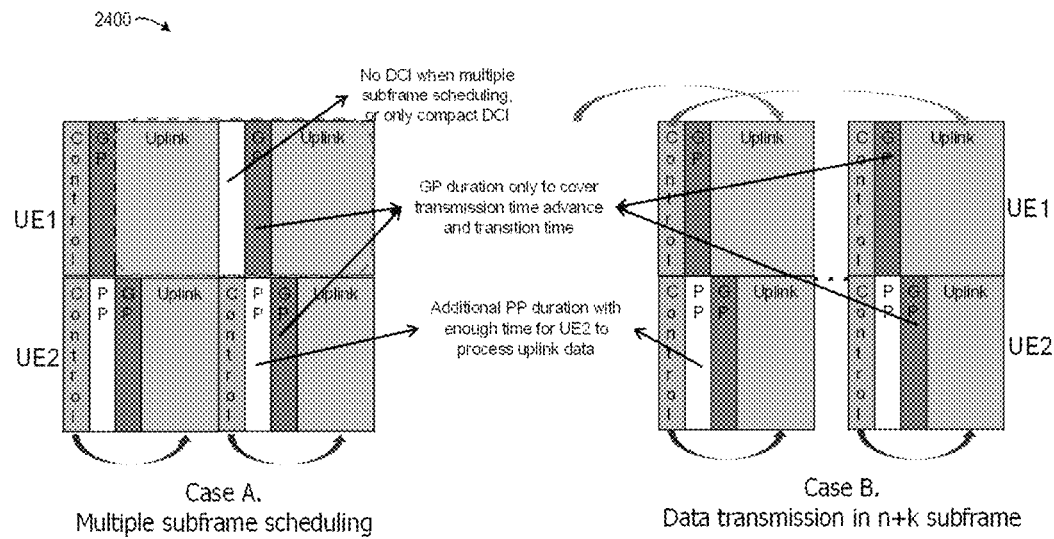
FIG. 24 illustrates a diagram 2400 of transmission patterns for UE1 and UE2 with respect to TDD and PP according to embodiments of the present disclosure.

FIG. 24 illustrates a diagram 2400 of transmission patterns for UE1 and UE2 with respect to TDD and PP according to embodiments of the present disclosure. In embodiments of FIG. 24, if UE2 needs to transmit uplink data in the same subframe, the GP may cover the sum of transmission advance for uplink and transition time (same for all UEs). In the embodiments, a PP is used for uplink data processing of UE2. While for UE1, the PP is not used when multiple subframe scheduling or n+k subframe scheduling. In the embodiments of FIG. 24, the PP and GP have different positions from those in embodiments described with FIG. 23.

Figure 25:
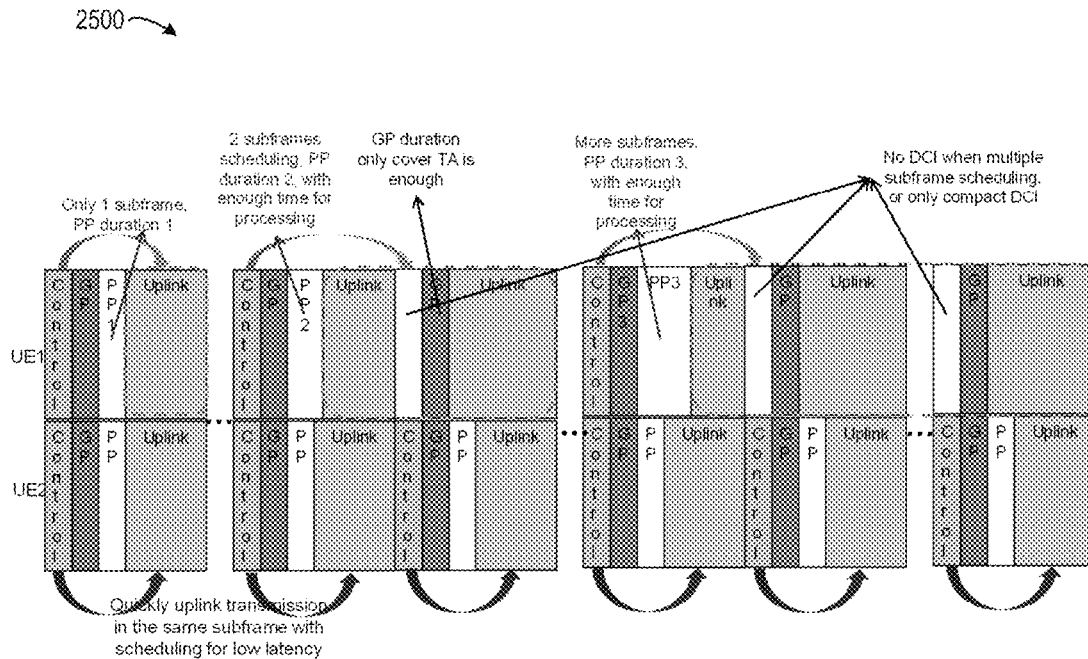
FIG. 25 illustrates a diagram 2500 of transmission patterns for UE1 and UE2 with respect to TDD and PP according to embodiments of the present disclosure.

FIG. 25 illustrates a diagram 2500 of transmission patterns for UE1 and UE2 with respect to TDD and PP according to embodiments of the present disclosure. In embodiments of FIG. 25, a long time duration of GP may be used for UE2, and a flexible GP duration may be used for UE1. As to UE1, uplink data transmission may be in the same subframe with scheduling, and the PP may be different with different subframe number (related to the TB size). For example, in the same subframe with both uplink data scheduling and the corresponding uplink data transmission, the PP is needed. And in other subframes with only uplink data transmission, the PP is not needed.

Figure 26:
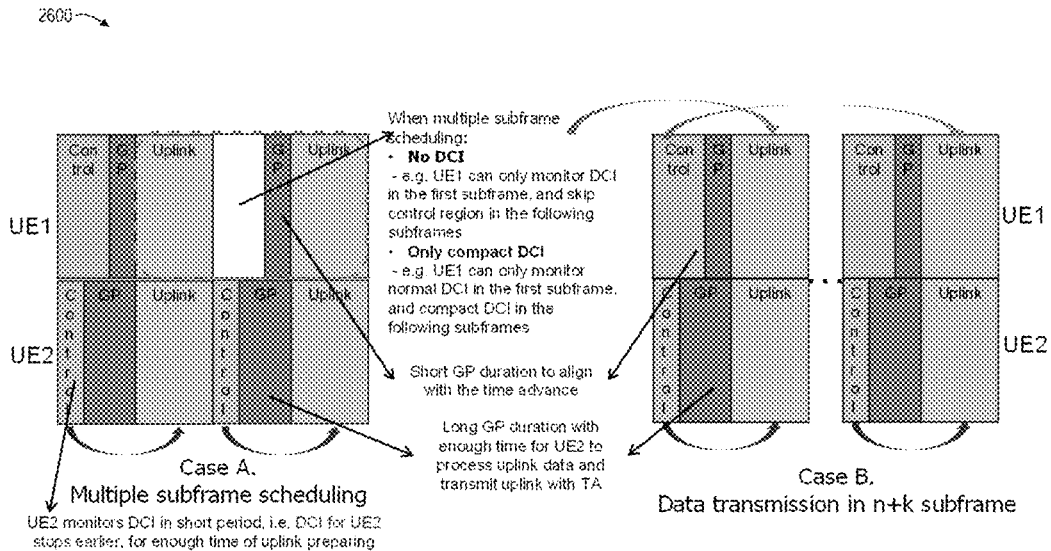
FIG. 26 illustrates a diagram 2600 of transmission patterns for UE1 and UE2 with respect to TDD and GP according to embodiments of the present disclosure.

FIG. 26 illustrates a diagram 2600 of transmission patterns for UE1 and UE2 with respect to TDD and GP according to embodiments of the present disclosure. In embodiments of FIG. 26, a long time duration of GP may be used for UE2 if quickly data transmission is needed in the same subframe. GP may cover a sum of preparing time, transmission advance for uplink and transition time. DCI for UE2 may complete earlier for enough time of data processing.

As to UE1, a short time duration of GP may be used. In an embodiment described with respect to Case A, for UE1 with multiple subframe scheduling, preparing time may be not needed in some subframes (only kept empty for the TA period for uplink transmission). In an embodiment described with respect to Case B, for UE1 with data transmission in the (n+k)$^{th}$ (k>=1) subframe, preparing time may be not needed.

Figure 27:
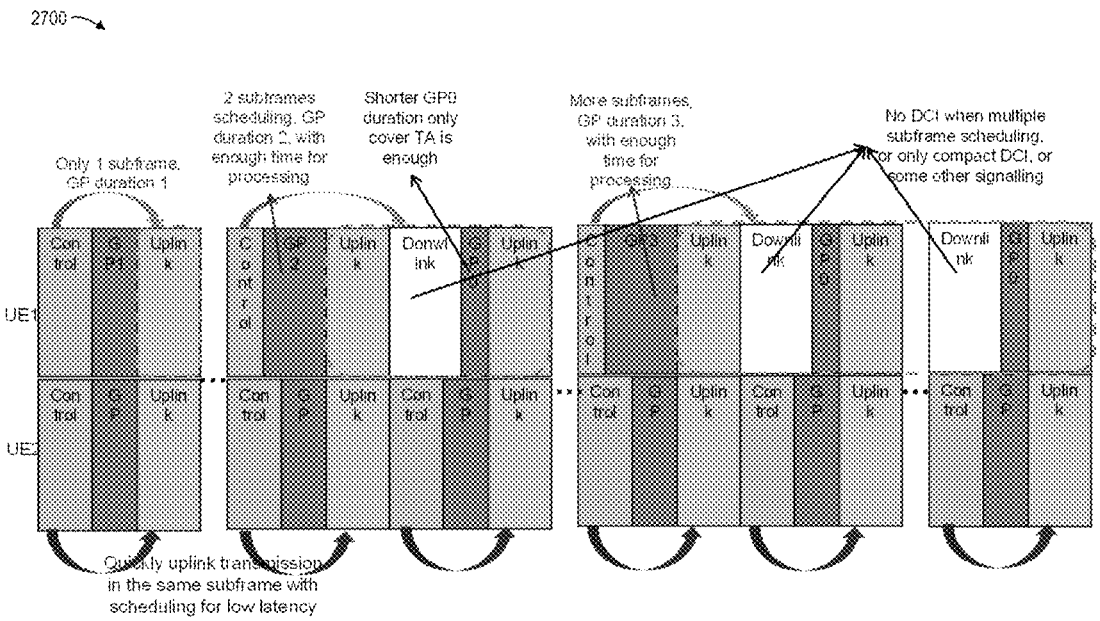
FIG. 27 illustrates a diagram 2700 of transmission patterns for UE1 and UE2 with respect to TDD and GP according to embodiments of the present disclosure.

FIG. 27 illustrates a diagram 2700 of transmission patterns for UE1 and UE2 with respect to TDD and GP according to embodiments of the present disclosure. In embodiments of FIG. 27, a long time duration of GP may be used for UE2.

UE1 may have a flexible control region, e.g. different DCI format or different DCI symbols for different scheduling. The GP may be different with different subframe number (related to the TB size). In addition, the GP may occupy some downlink duration.

Figure 28:
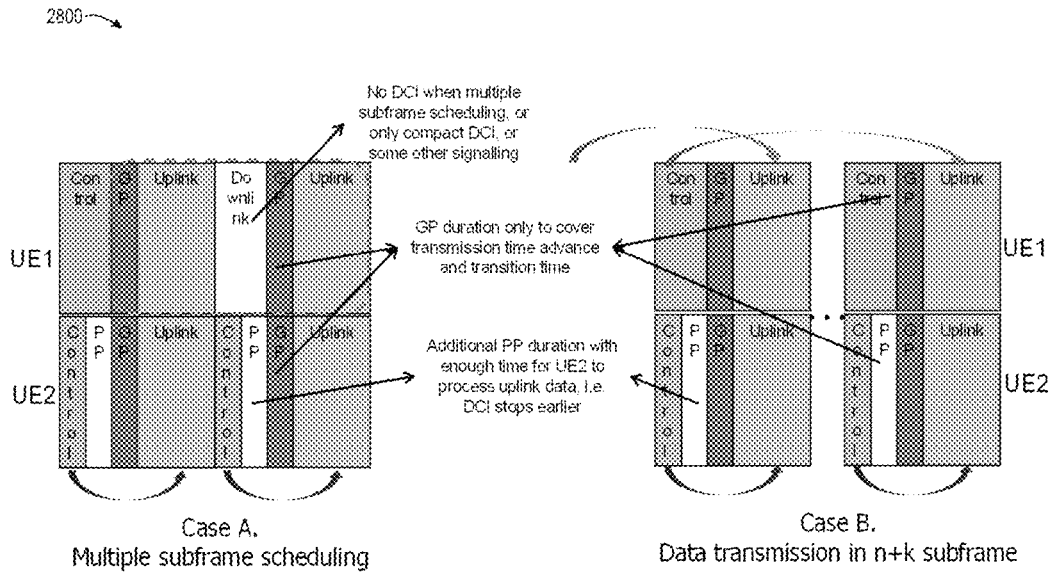
FIG. 28 illustrates a diagram 2800 of transmission patterns for UE1 and UE2 with respect to TDD and PP according to embodiments of the present disclosure.

FIG. 28 illustrates a diagram 2800 of transmission patterns for UE1 and UE2 with respect to TDD and PP according to embodiments of the present disclosure. In embodiments of FIG. 28, if UE2 is to transmit uplink data in the same subframe, the GP may cover the sum of transmission advance for uplink and transition time (same for all UEs). The PP may be used for uplink data processing. The PP may occupy downlink region. As to UE1, no PP is needed when multiple subframe scheduling or n+k subframe scheduling.

Figure 29:
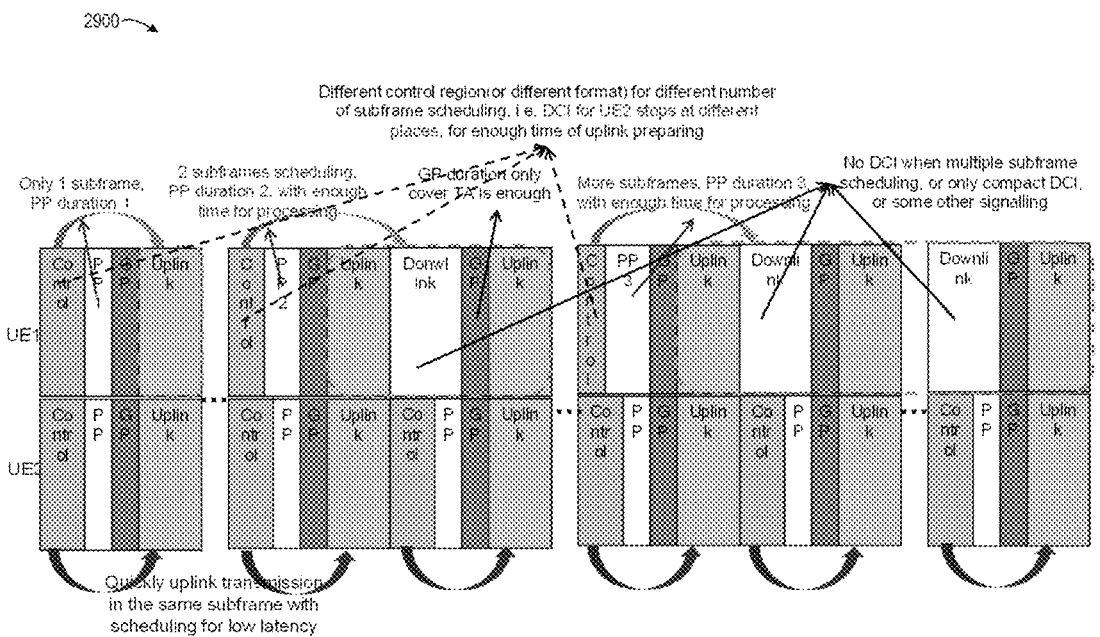
FIG. 29 illustrates a diagram 2900 of transmission patterns for UE1 and UE2 with respect to TDD and PP according to embodiments of the present disclosure.

FIG. 29 illustrates a diagram 2900 of transmission patterns for UE1 and UE2 with respect to TDD and PP according to embodiments of the present disclosure. In embodiments of FIG. 29, a long time duration of PP may be used for UE2.

UE1 may have a flexible control region, e.g. different DCI format or different DCI symbols for different scheduling. The PP may be different with different subframe number (related to the TB size). In addition, the PP may occupy some downlink duration.

Figure 30:
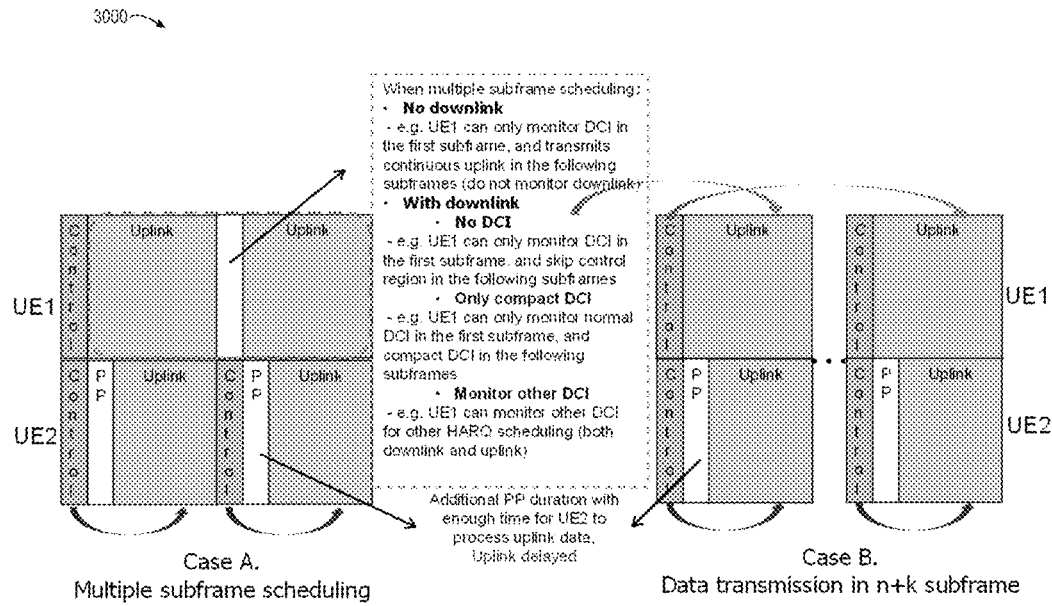
FIG. 30 illustrates a diagram 3000 of transmission patterns for UE1 and UE2 with respect to FDD and PP according to embodiments of the present disclosure.

FIG. 30 illustrates a diagram 3000 of transmission patterns for UE1 and UE2 with respect to FDD and PP according to embodiments of the present disclosure. In embodiments of FIG. 30, if UE2 needs to transmit uplink data in the same subframe. There may be a PP for uplink data processing. As to UE1, no PP is needed when multiple subframe scheduling or n+k subframe scheduling.

Figure 31:
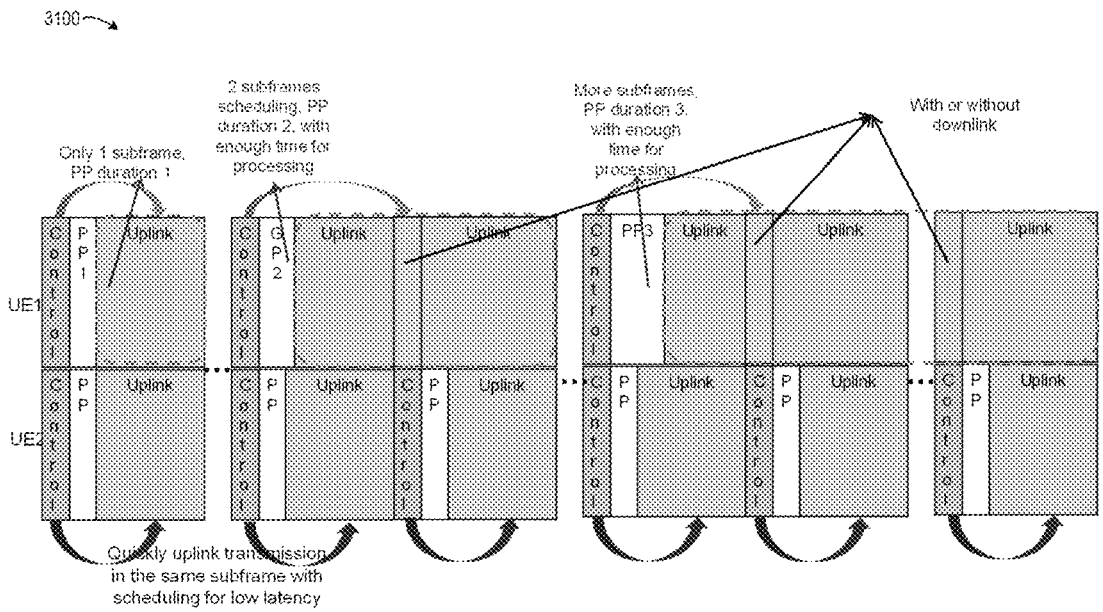
FIG. 31 illustrates a diagram 3100 of transmission patterns for UE1 and UE2 with respect to FDD and PP according to embodiments of the present disclosure.

FIG. 31 illustrates a diagram 3100 of transmission patterns for UE1 and UE2 with respect to FDD and PP according to embodiments of the present disclosure. In embodiments of FIG. 31, a long time duration of PP may be used for UE2. As to UE1, a flexible time duration of PP may be used. Uplink data transmission of UE1 may be in the same subframe with scheduling. The PP may be different with different subframe number (related to the TB size)

Figure 32:
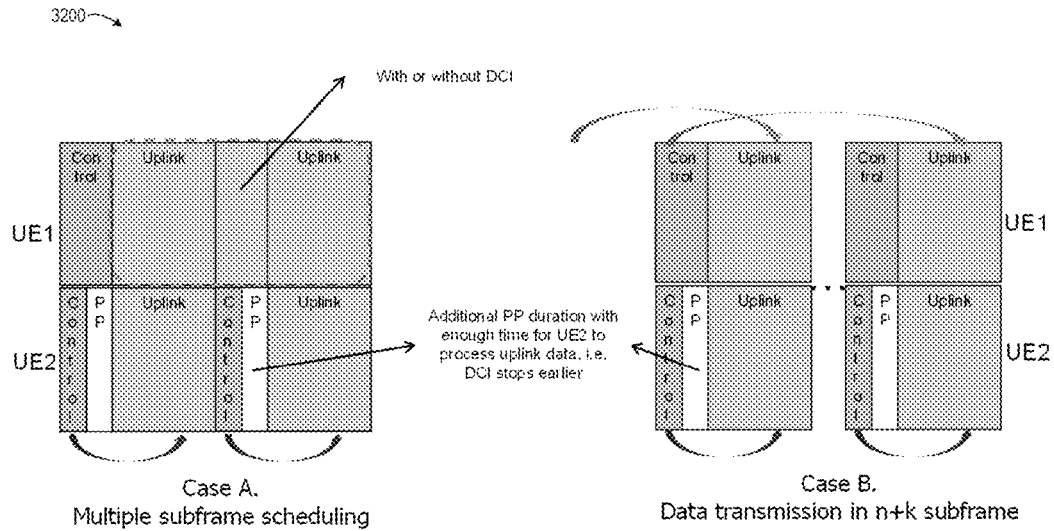
FIG. 32 illustrates a diagram 3200 of transmission patterns for UE1 and UE2 with respect to FDD and PP according to embodiments of the present disclosure.

FIG. 32 illustrates a diagram 3200 of transmission patterns for UE1 and UE2 with respect to FDD and PP according to embodiments of the present disclosure. In embodiments of FIG. 32, if UE2 is to transmit uplink data in the same subframe, the GP may cover a sum of transmission advance for uplink and transition time (same for all UE). There may be a PP for uplink data processing. The PP may occupy downlink region. While for UE1, no PP is needed when multiple subframe scheduling or n+k subframe scheduling.

Figure 33:
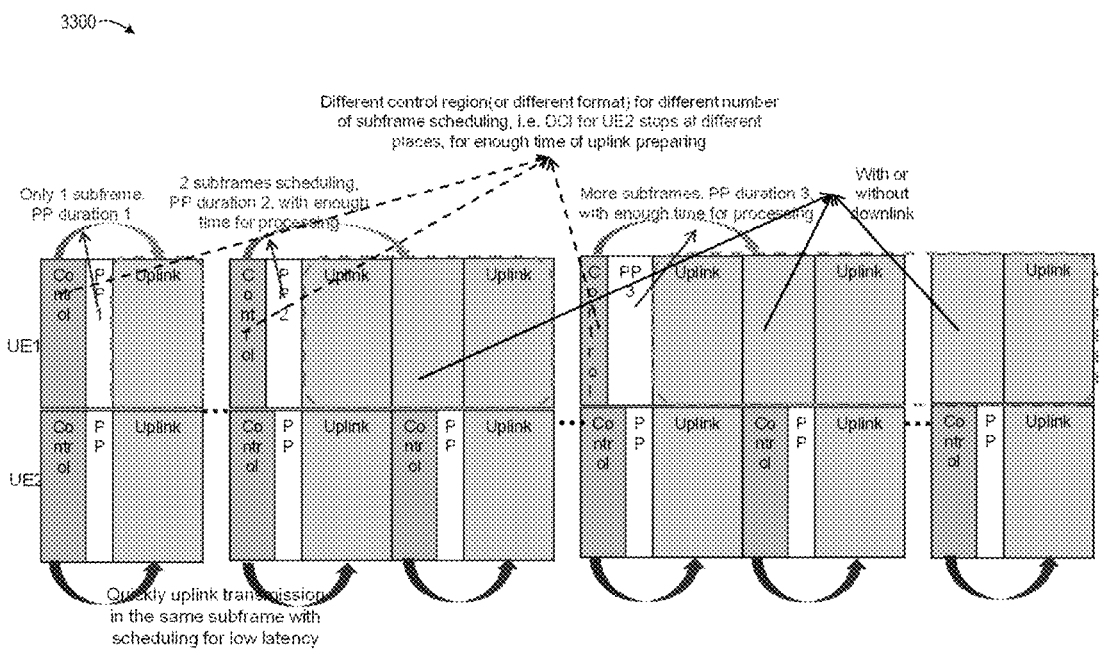
FIG. 33 illustrates a diagram 3300 of transmission patterns for UE1 and UE2 with respect to FDD and PP according to embodiments of the present disclosure.

FIG. 33 illustrates a diagram 3300 of transmission patterns for UE1 and UE2 with respect to FDD and PP according to embodiments of the present disclosure. In embodiments of FIG. 33, a long time duration of PP may be used for UE2.

UE1 may have a flexible control region, e.g. different DCI format or different DCI symbols for different scheduling. The PP may be different with different subframe number (related to the TB size). In addition, the PP may occupy some downlink duration.

Figure 34:
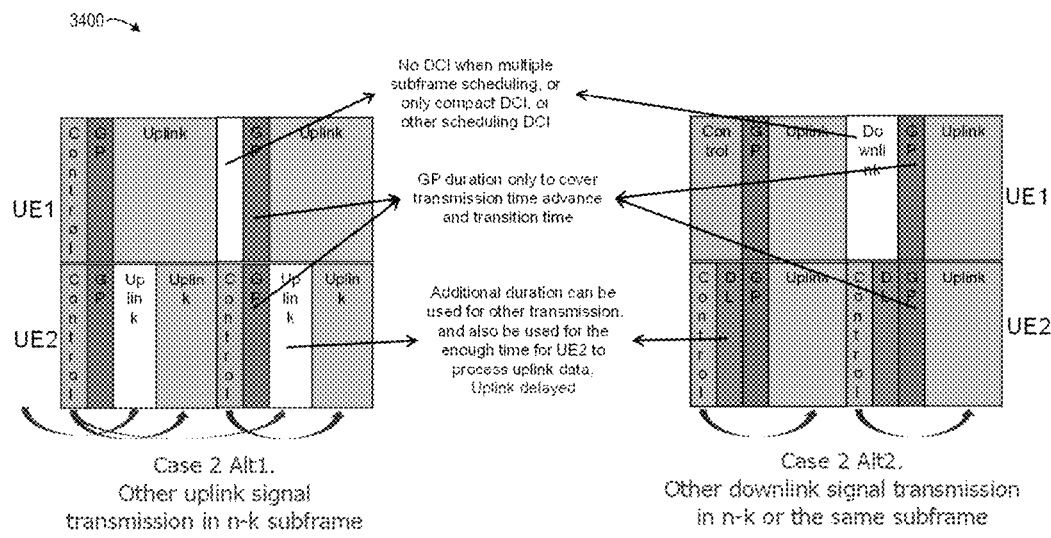
FIG. 34 illustrates a diagram 3400 of transmission patterns for UE1 and UE2 with respect to TDD and PP according to embodiments of the present disclosure.

FIG. 34 illustrates a diagram 3400 of transmission patterns for UE1 and UE2 with respect to TDD and PP according to embodiments of the present disclosure. In embodiments of FIG. 34, the time duration of PP may be used for other scheduling. In an embodiment described with respect to Case 2 Alt1, the PP may be used for other uplink scheduling, and the UL grant may be in n–k (k>=1) subframe for enough preparing time. In an embodiment described with respect to Case 2 Alt2, the PP may be used for other downlink scheduling, when the PP occupies downlink duration.

Figure 35:
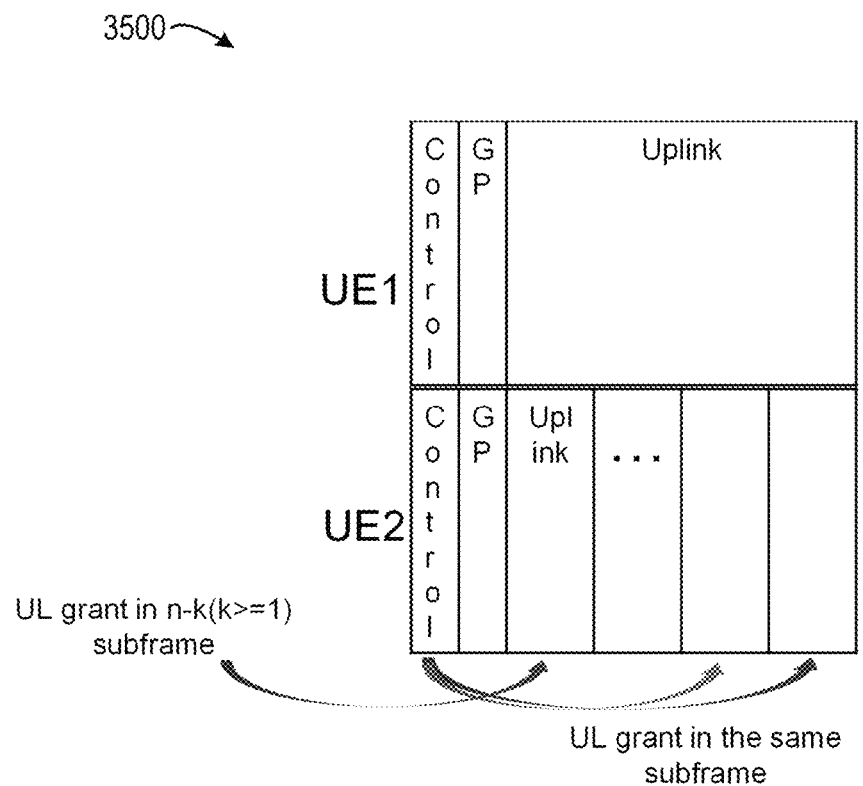
FIG. 35 illustrates a diagram 3500 of transmission patterns for UE1 and UE2 with respect to TDD and PP according to embodiments of the present disclosure.

FIG. 35 illustrates a diagram 3500 of transmission patterns for UE1 and UE2 with respect to TDD and PP according to embodiments of the present disclosure. In embodiments of FIG. 35, for UE2, there may be a plurality of UL transmission parts. In one or more of the UL transmission parts, the UL grant may be in the same subframe (with enough time for data processing). With regard to others UL transmission parts, the UL grant may be in the (n–k)$^{th}$ subframe, k>=1.

Figure 36:
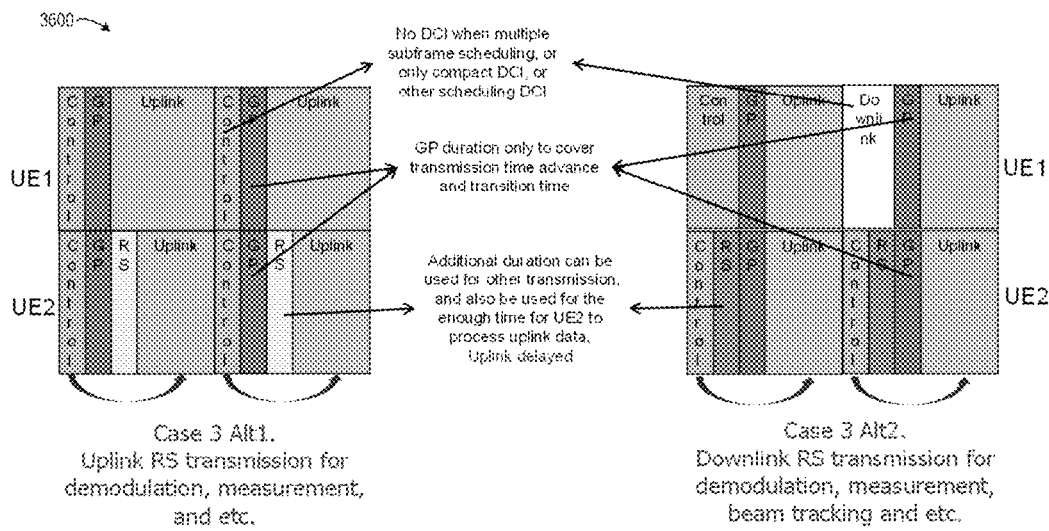
FIG. 36 illustrates a diagram 3600 of transmission patterns for UE1 and UE2 with respect to TDD and PP according to embodiments of the present disclosure.

FIG. 36 illustrates a diagram 3600 of transmission patterns for UE1 and UE2 with respect to TDD and PP according to embodiments of the present disclosure. In embodiments of FIG. 36, the time duration of PP may be used for RS transmission. The RS may be triggered or semi-statically configured periodically or aperiodically. In an embodiment described with respect to Case 3 Alt1, the time duration of PP may be used for uplink RS transmission when PP occupies uplink region, and may be used for uplink demodulation, measurement, and/or the like. In an embodiment described with respect to Case 3 Alt2, the time duration of PP may be used for downlink RS when PP occupies downlink region, and may be used for measurement, beam tracking, demodulation and etc.

Figure 37:
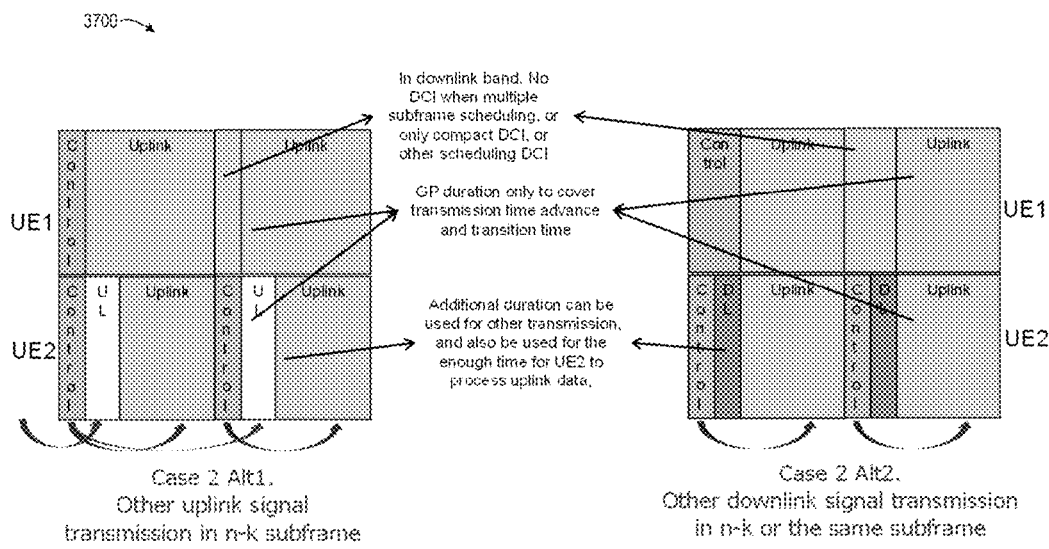
FIG. 37 illustrates a diagram 3700 of transmission patterns for UE1 and UE2 with respect to FDD and PP according to embodiments of the present disclosure.

FIG. 37 illustrates a diagram 3700 of transmission patterns for UE1 and UE2 with respect to FDD and PP according to embodiments of the present disclosure. In embodiments of FIG. 37, the time duration of PP may be used for other scheduling. In an embodiment described with respect to Case 2 Alt1, the time duration of PP may be used for other UL scheduling, and the UL grant may be in the (n–k)$^{th}$ subframe (k>=1) for enough preparing time. In an embodiment described with respect to Case 2 Alt2. the time duration of PP may be used for other downlink scheduling, when the PP occupies downlink duration.

Figure 38:
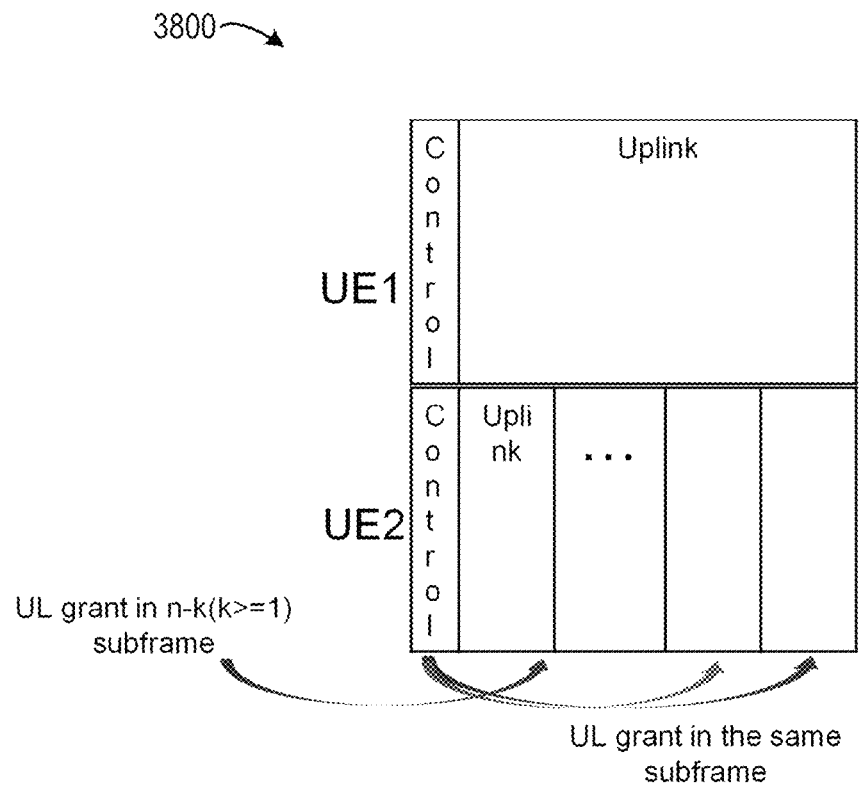
FIG. 38 illustrates a diagram 3800 of transmission patterns for UE1 and UE2 with respect to FDD and PP according to embodiments of the present disclosure.

FIG. 38 illustrates a diagram 3800 of transmission patterns for UE1 and UE2 with respect to FDD and PP according to embodiments of the present disclosure. In embodiments of FIG. 38, there may be a plurality of UL transmission parts. In one or more of the UL transmission parts, the UL grant may be in the same subframe (with enough time for data processing). With regard to others UL transmission parts, the UL grant may be in the (n–k)$^{th}$ subframe, k>=1.

Figure 39:
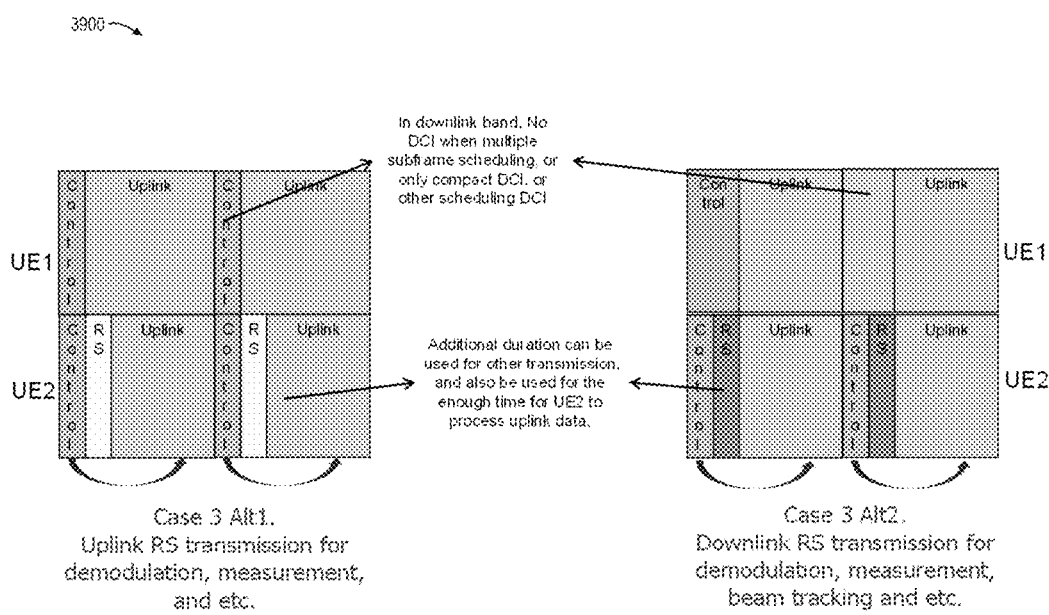
FIG. 39 illustrates a diagram 3900 of transmission patterns for UE1 and UE2 with respect to FDD and PP according to embodiments of the present disclosure.

FIG. 39 illustrates a diagram 3900 of transmission patterns for UE1 and UE2 with respect to FDD and PP according to embodiments of the present disclosure. In embodiments of FIG. 39, the time duration of PP may be used for RS transmission. The RS may be triggered or semi-statically configured periodically or aperiodically. In an embodiment described with respect to Case 3 Alt1, the time duration of PP may be used for uplink RS transmission when PP occupies uplink region, and may be used for uplink demodulation, measurement, and/or the like. In an embodiment described with respect to Case 3 Alt2, the time duration of PP may be used for downlink RS when PP occupies downlink region, and may be used for measurement, beam tracking, demodulation and etc.

Figure 40:
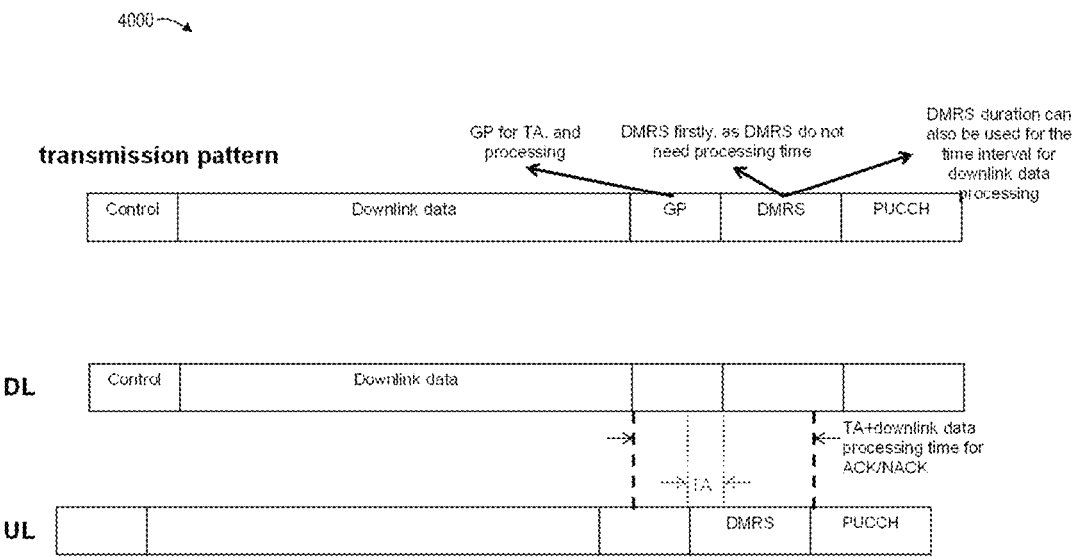
FIG. 40 illustrates a diagram 4000 of a transmission pattern according to embodiments of the present disclosure.

FIG. 40 illustrates a diagram 4000 of a transmission pattern according to embodiments of the present disclosure. In illustrated transmission pattern, if there is PUCCH transmission for ACK/NACK, it may have the structure of "DMRS+PUCCH." In other words, the demodulation reference signal (DMRS) may be transmitted before the PUCCH signal. For DMRS transmission, the period may also be used for the downlink data processing for the corresponding ACK/NACK.

Figure 41:
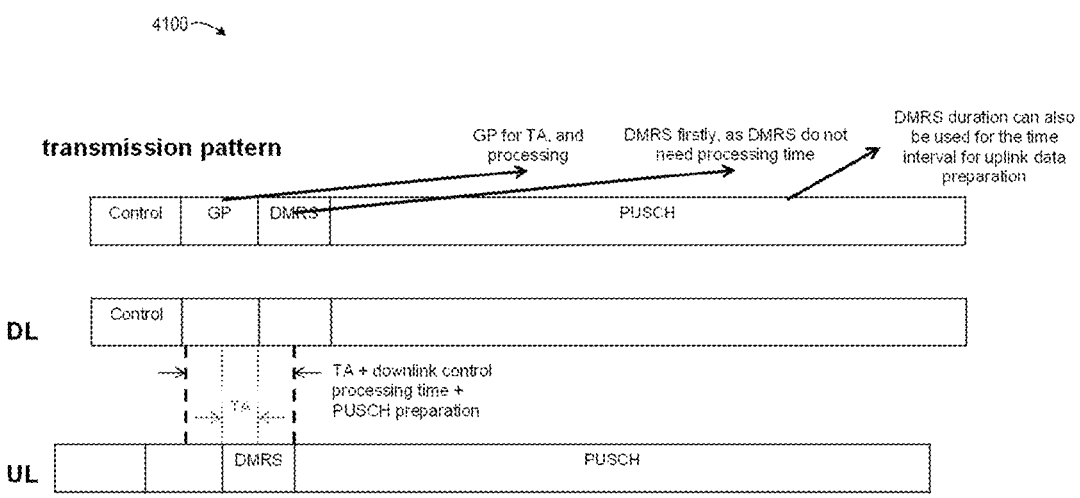
FIG. 41 illustrates a diagram 4100 of a transmission pattern according to embodiments of the present disclosure.

FIG. 41 illustrates a diagram 4100 of a transmission pattern according to embodiments of the present disclosure. In illustrated transmission pattern, if there is PUSCH scheduled, it may have the structure of "DMRS+PUSCH." In other words, the DMRS may be transmitted before the PUCCH signal. The DMRS transmission duration may also be used for the uplink data preparation.

Figure 42:
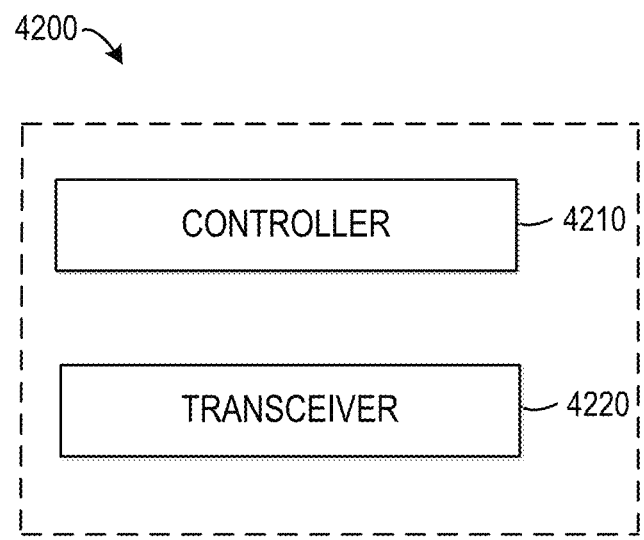
FIG. 42 illustrates a schematic diagram of a device 4200 according to an embodiment of the present disclosure.

FIG. 42 illustrates a schematic diagram of a device 4200 according to an embodiment of the present disclosure. According to embodiments of the present disclosure, the device 4200 may be implemented at a network device, such as the BS 110, a terminal device, such as the UE 121 or 122, or other suitable device in the communication system.

As shown in FIG. 42, the device 4200 comprises: a controller 4210 configured to determine a target transmission pattern from a set of candidate transmission patterns, wherein each of the candidate transmission patterns contains a DL transmission part and/or a UL transmission part, and the candidate transmission patterns differ from one another in terms of time durations of the respective DL transmission parts and/or the UL transmission parts; and a transceiver 4220 configured to perform communication between a network device and a terminal device by using the target transmission pattern.

In an embodiment, one or more of the candidate transmission patterns may further include a GP part, wherein the GP part is between the DL transmission part and the UL transmission part.

In an embodiment, the target transmission pattern may be determined based on a feedback requirement requiring a feedback about the DL transmission to be sent in the target transmission pattern, and the target transmission pattern may include a processing period for the terminal device to process data received in the DL transmission.

In an embodiment, the target transmission pattern may be applicable in a TDD transmission mode, and length of a GP part may be extended by the processing period, or length of the DL transmission part is reduced by the processing period.

In an embodiment, the target transmission pattern may be applicable in a FDD transmission mode, and length of the DL transmission part may be reduced by the processing period.

In an embodiment, the processing period may be used for further DL transmission of data, control information or a reference signal, and feedback about the further DL transmission is to be sent after the target transmission pattern.

In an embodiment, the target transmission pattern may be determined based on a scheduling requirement requiring scheduling information about the UL transmission is to be sent in the target transmission pattern, and the target transmission pattern may include a processing period for the terminal device to prepare data to be transmitted in the UL transmission.

In an embodiment, the target transmission pattern may be applicable in a TDD transmission mode, and length of a GP part may be extended by the processing period, or length of the UL transmission part is reduced by the processing period.

In an embodiment, the target transmission pattern may be applicable in a FDD transmission mode, and length of the UL transmission part may be reduced by the processing period.

In an embodiment, the processing period may be used for further UL transmission of data or a reference signal, and scheduling information about the further UL transmission may be sent before the target transmission pattern.

In an embodiment, the controller is further configured to determine, at the network device, a target transmission pattern from the set of candidate transmission patterns for each of terminal devices served by the network device, without requiring the target transmission pattern is the same for each of terminal devices.

In an embodiment, the target transmission pattern may include an indication in control information transmitted in the DL transmission part and/or the UL transmission part, wherein the indication indicates one or more of: the time duration of the DL transmission part and/or the UL transmission part; a time duration of a GP part between the DL transmission part and the UL transmission part; and whether there is communication on the DL transmission part or the UL transmission part.

Embodiments of the present disclosure also provided an apparatus implemented at a network device or a terminal device. The apparatus may include means for determining a target transmission pattern from a set of candidate transmission patterns, wherein each of the candidate transmission patterns contains a downlink (DL) transmission part and/or an uplink (UL) transmission part, and the candidate transmission patterns differ from one another in terms of time durations of the respective DL transmission parts and/or the UL transmission parts; and means for performing communication between a network device and a terminal device by using the target transmission pattern.

It is also to be noted that the device 4200 may be respectively implemented by any suitable technique either known at present or developed in the future. Further, a single device shown in FIG. 42 may be alternatively implemented in multiple devices separately, and multiple separated devices may be implemented in a single device. The scope of the present disclosure is not limited in these regards.

It is noted that the device 4200 may be configured to implement functionalities as described with reference to FIGS. 3-41. Therefore, the features discussed with respect to the method 300 may apply to the corresponding components of the device 4200. It is further noted that the components of the device 4200 may be embodied in hardware, software, firmware, and/or any combination thereof. For example, the components of the device 4200 may be respectively implemented by a circuit, a processor or any other appropriate device. Those skilled in the art will appreciate that the aforesaid examples are only for illustration not limitation.

In some embodiment of the present disclosure, the device 4200 may comprise at least one processor. The at least one processor suitable for use with embodiments of the present disclosure may include, by way of example, both general and special purpose processors already known or developed in the future. The device 4200 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 4200 to at least perform according to the method 300 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 3 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a device, comprising:
   determining a target transmission pattern from a set of candidate transmission patterns, wherein the target transmission pattern contains a downlink (DL) transmission part and/or an uplink (UL) transmission part;
   receiving a downlink control information (DCI) comprising an indication indicating that there is no transmission for the device on at least part of the DL transmission part and/or UL transmission part, and
   performing communication with a network device based on the target transmission pattern and the DCI.

2. The method according to claim 1, wherein one or more of the candidate transmission patterns further include a guard period (GP) part, the GP part being between the DL transmission part and the UL transmission part.

3. The method according to claim 1, wherein the target transmission pattern is determined based on a feedback requirement requiring a feedback about the DL transmission to be sent in the target transmission pattern, and
   wherein the target transmission pattern includes a processing period for the terminal device to process data received in the DL transmission.

4. The method according to claim 3, wherein the target transmission pattern is applicable in a Time Division Duplexing (TDD) transmission mode, and
   wherein length of a guard period (GP) part is extended by the processing period, or length of the DL transmission part is reduced by the processing period.

5. The method according to claim 3, wherein the target transmission pattern is applicable in a Frequency Division Duplexing (FDD) transmission mode, and
   wherein length of the DL transmission part is reduced by the processing period.

6. The method according to claim 4, wherein the processing period is used for further DL transmission of data, control information or a reference signal, and feedback about the further DL transmission is to be sent after the target transmission pattern.

7. The method according to claim 1, wherein the target transmission pattern is determined based on a scheduling requirement requiring scheduling information about the UL transmission is to be sent in the target transmission pattern, and
   wherein the target transmission pattern includes a processing period for the terminal device to prepare data to be transmitted in the UL transmission.

8. The method according to claim 7, wherein the target transmission pattern is applicable in a Time Division Duplexing (TDD) transmission mode, and
   wherein length of a guard period (GP) part is extended by the processing period, or length of the UL transmission part is reduced by the processing period.

9. The method according to claim 8, wherein the target transmission pattern is applicable in a Frequency Division Duplexing (FDD) transmission mode, and
   wherein length of the UL transmission part is reduced by the processing period.

10. The method according to claim 8, wherein the processing period is used for further UL transmission of data or a reference signal, and scheduling information about the further UL transmission is sent before the target transmission pattern.

11. The method according to claim 1, wherein determining the target transmission pattern comprises:
    determining, at the network device, a target transmission pattern from the set of candidate transmission patterns for each of terminal devices served by the network device, without requiring the target transmission pattern is the same for each of terminal devices.

12. The method according to claim 1, wherein the target transmission pattern includes an indication in control information transmitted in the DL transmission part and/or the UL transmission part, wherein the indication indicates one or more of:
    the time duration of the DL transmission part and/or the UL transmission part; and
    a time duration of a guard period (GP) part between the DL transmission part and the UL transmission part.

13. A device for performing communication, comprising:
    a controller configured to determine a target transmission pattern from a set of candidate transmission patterns, wherein the target transmission pattern contains a downlink (DL) transmission part and/or an uplink (UL) transmission part; and
    a transceiver configured to:
    receive a downlink control information (DCI) comprising an indication indicating that there is no downlink communication for the device on at least part of the DL transmission part, and
    perform communication with a network device based on the target transmission pattern and the DCI.

14. The device according to claim 13, wherein one or more of the candidate transmission patterns further include a guard period (GP) part, the GP part being between the DL transmission part and the UL transmission part.

15. The device according to claim 13, wherein the target transmission pattern is determined based on a feedback requirement requiring a feedback about the DL transmission to be sent in the target transmission pattern, and
    wherein the target transmission pattern includes a processing period for the terminal device to process data received in the DL transmission.

16. The device according to claim 15, wherein the target transmission pattern is applicable in a Time Division Duplexing (TDD) transmission mode, and
    wherein length of a guard period (GP) part is extended by the processing period, or length of the DL transmission part is reduced by the processing period.

17. The device according to claim 15, wherein the target transmission pattern is applicable in a Frequency Division Duplexing (FDD) transmission mode, and
    wherein length of the DL transmission part is reduced by the processing period.

18. The device according to claim 16, wherein the processing period is used for further DL transmission of data, control information or a reference signal, and feedback about the further DL transmission is to be sent after the target transmission pattern.

19. The device according to claim 13, wherein the target transmission pattern is determined based on a scheduling requirement requiring scheduling information about the UL transmission is to be sent in the target transmission pattern, and wherein the target transmission pattern includes a processing period for the terminal device to prepare data to be transmitted in the UL transmission.

20. The device according to claim 19, wherein the target transmission pattern is applicable in a Time Division Duplexing (TDD) transmission mode, and wherein length of a guard period (GP) part is extended by the processing period, or length of the UL transmission part is reduced by the processing period.

21. The device according to claim 20, wherein the target transmission pattern is applicable in a Frequency Division Duplexing (FDD) transmission mode, and wherein length of the UL transmission part is reduced by the processing period.

22. The device according to claim 20, wherein the processing period is used for further UL transmission of data or a reference signal, and scheduling information about the further UL transmission is sent before the target transmission pattern.

23. The device according to claim 13, wherein the controller is further configured to determine, at the network device, a target transmission pattern from the set of candidate transmission patterns for each of terminal devices served by the network device, without requiring the target transmission pattern is the same for each of terminal devices.

24. The device according to claim 13, wherein the target transmission pattern includes an indication in control information transmitted in the DL transmission part and/or the UL transmission part, wherein the indication indicates one or more of:

the time duration of the DL transmission part and/or the UL transmission part; and a time duration of a guard period (GP) part between the DL transmission part and the UL transmission part.

* * * * *